(12) United States Patent
Yamauchi

(10) Patent No.: US 6,313,387 B1
(45) Date of Patent: Nov. 6, 2001

(54) APPARATUS AND METHOD FOR EDITING A MUSIC SCORE BASED ON AN INTERMEDIATE DATA SET INCLUDING NOTE DATA AND SIGN DATA

(75) Inventor: Akira Yamauchi, Hamamatsu (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 09/527,647

(22) Filed: Mar. 17, 2000

(30) Foreign Application Priority Data

Mar. 17, 1999 (JP) .................................................. 11-072024

(51) Int. Cl.⁷ ............................. G09B 15/04; G10H 1/26; G10H 7/00
(52) U.S. Cl. ........................................... 84/609; 84/477 R
(58) Field of Search ..................... 84/609–614, 634–638, 84/477 R, 478

(56) References Cited

U.S. PATENT DOCUMENTS 5,153,829 * 10/1992 Furaya et al. ................... 84/477 R X
6,046,394 * 4/2000 Hino .................................. 84/477 R

* cited by examiner

Primary Examiner—Stanley J. Witkowski
(74) Attorney, Agent, or Firm—Rossi & Associates

(57) ABSTRACT

A music score editing apparatus handles a music score data set, an intermediate data set and a performance data set for a piece of music. The apparatus processes the data sets for plural pieces of music. The music score data set is composed as including display event data that define notes and signs in musical notation and respective positions of the notes and signs for displaying a music score in a form of musical notation. The intermediate data set is created corresponding to the music score data set and includes a note data set which contains note event data corresponding to the notes and their respective positions, and a sign data set which contains sign event data corresponding to the signs and their respective positions. The performance data set is created corresponding to the intermediate data set, and includes performance event data that define notes to be played in terms of at least pitches and generation times of the respective notes to perform a musical piece as defined by the music score data set.

14 Claims, 20 Drawing Sheets

Note Data

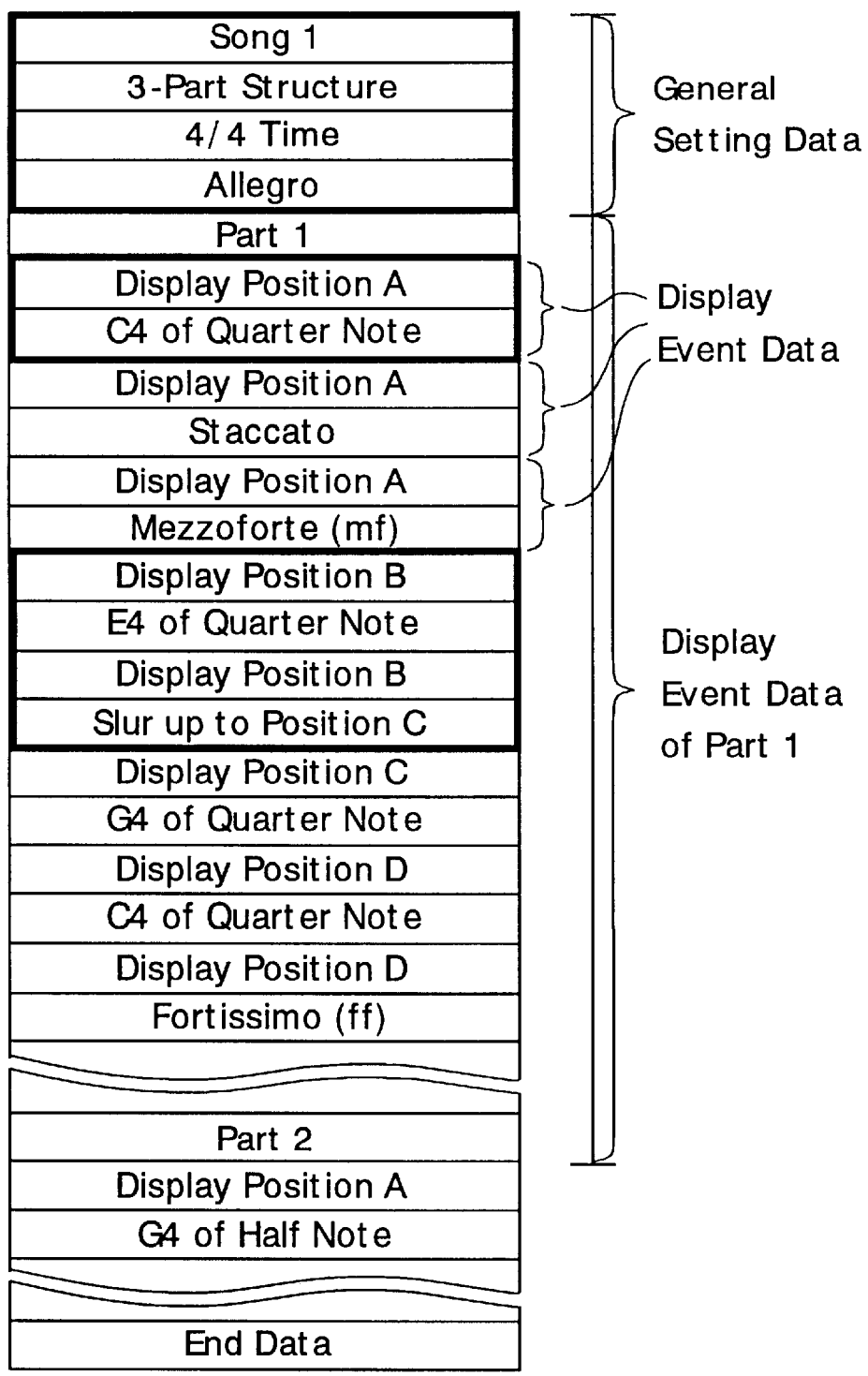
Fig.2a  Music Score Data

Fig.2b  Music Score Data

After Edition (Event Added)

| Song 1 |
|---|
| 3-Part Structure |
| 4/4 Time |
| Allegro |
| Part 1 |
| Display Position A |
| C4 of Quarter Note |
| Display Position A |
| Staccato |
| Display Position A |
| Mezzoforte (mf) |
| Display Position A |
| Crescendo up to Display Position D |
| Display Position B |
| E4 of Quarter Note |
| End Data | a { (brackets the two bolded rows)

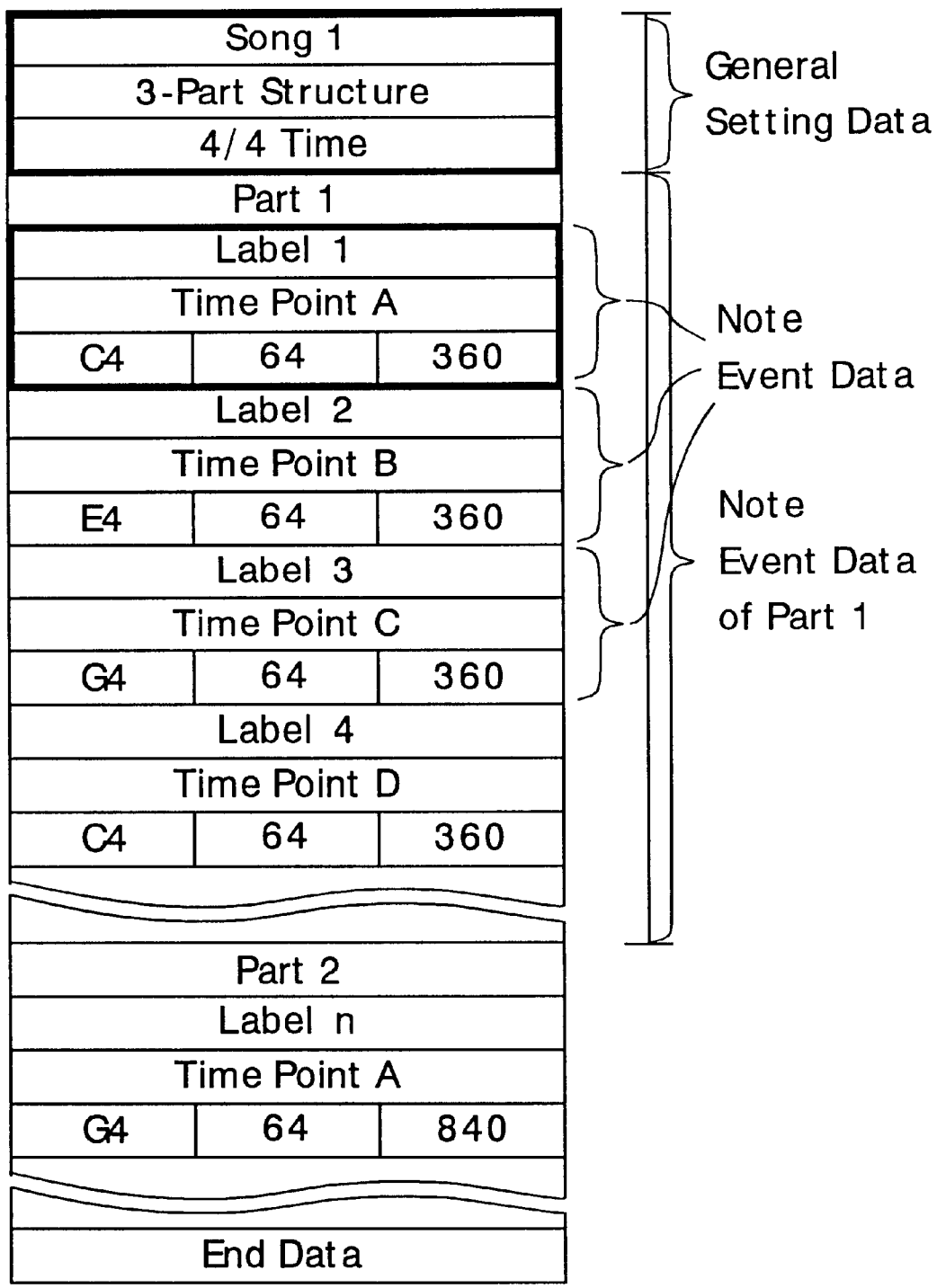
Fig.3 Note Data

Fig.4a Sign Data
Before Edition (As Composed)
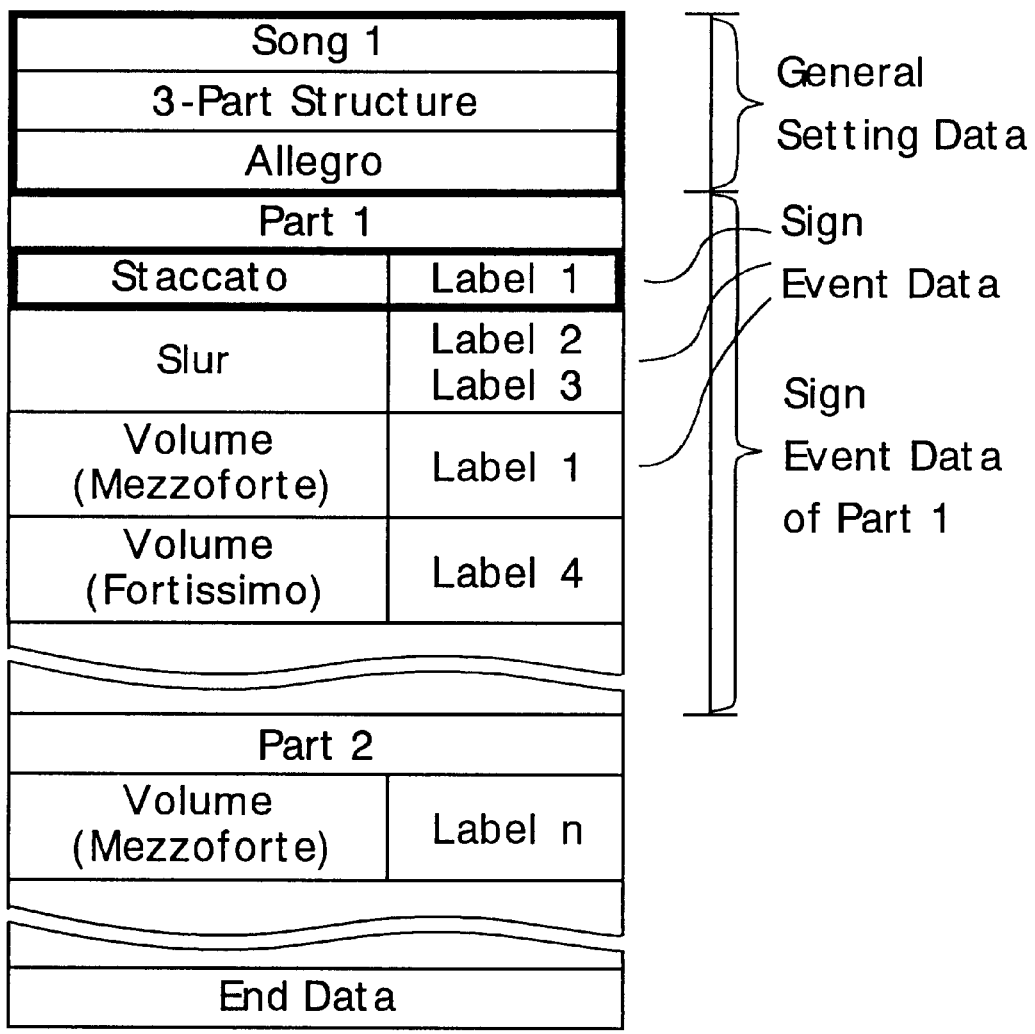

Fig.4b Sign Data

After Edition (Event Added)

| Song 1 | |
|---|---|
| 3-Part Structure | |
| Allegro | |
| Part 1 | |
| Staccato | Label 1 |
| Slur | Label 2<br>Label 3 |
| Volume<br>(Mezzoforte) | Label 1 |
| Volume<br>(Fortissimo) | Label 4 |
| Volume<br>(Crescendo) | Label 1<br>≀<br>Label 4 |
| End Data | |

A — (points to Volume (Crescendo) row)

Fig.5a  Performance Data

Before Edition (As Composed)

| Song 1 |  |  |
|---|---|---|
| 3-Part Structure |  |  |
| Tempo Value |  |  |
| Part 1 |  |  |
| Time Point (0) |  |  |
| C4 | 80 | 240 |
| Time Point (480) |  |  |
| E4 | 64 | 480 |
| Time Point (960) |  |  |
| G4 | 64 | 360 |
| Time Point (1440) |  |  |
| C4 | 110 | 360 |
| Part 2 |  |  |
| Time Point (0) |  |  |
| G4 | 80 | 840 |
| End Data |  |  |

General Setting Data

Performance Event Data

Performance Event Data of Part 1

Fig.5b  Performance Data

After Edition (Event Added)

| Song 1 | | |
|---|---|---|
| 3-Part Structure | | |
| Tempo Value | | |
| Part 1 | | |
| Time Point (0) | | |
| C4 | 80 | 240 |
| Time Point (240) | | |
| Volume | | +5 |
| Time Point (480) | | |
| E4 | 80 | 480 |
| Volume | | +5 |
| Time Point (720) | | |
| Volume | | +5 |
| Time Point (960) | | |
| G4 | 80 | 360 |
| Volume | | +5 |
| Time Point (1200) | | |
| Volume | | +5 |
| Time Point (1440) | | |
| C4 | 80 | 360 |
| Volume | | +5 |
| End Data | | |

A'

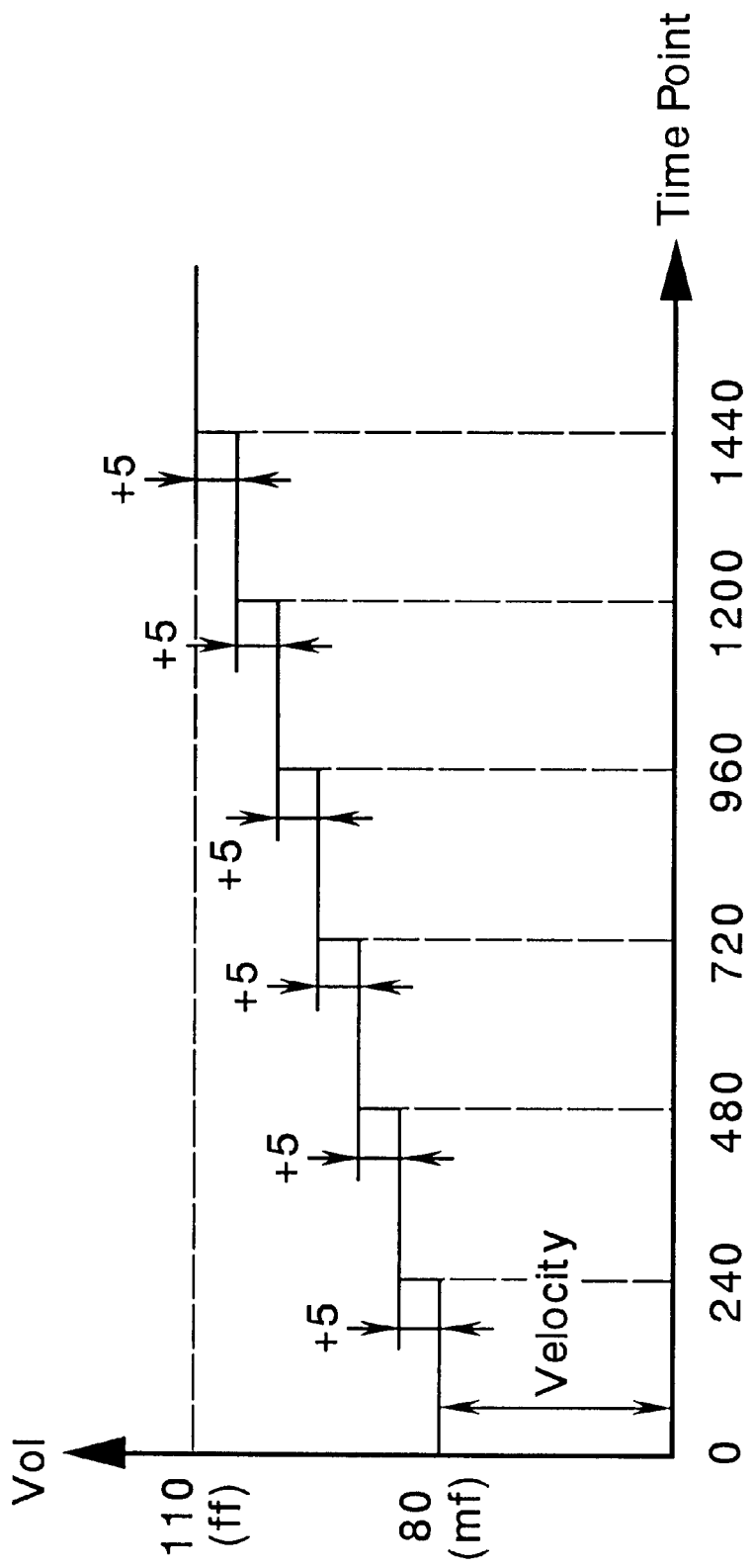

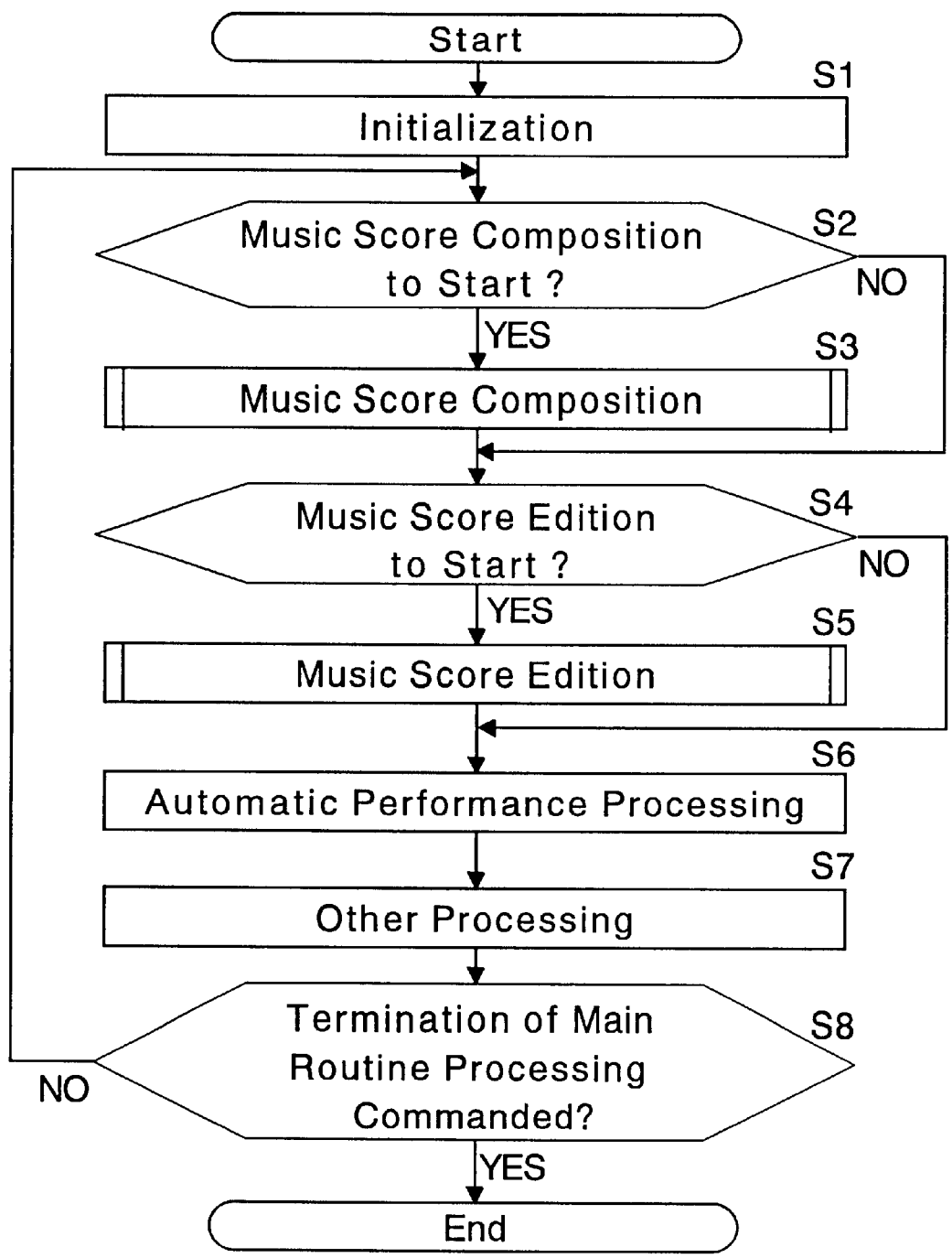

Fig.7 Music Score Composition
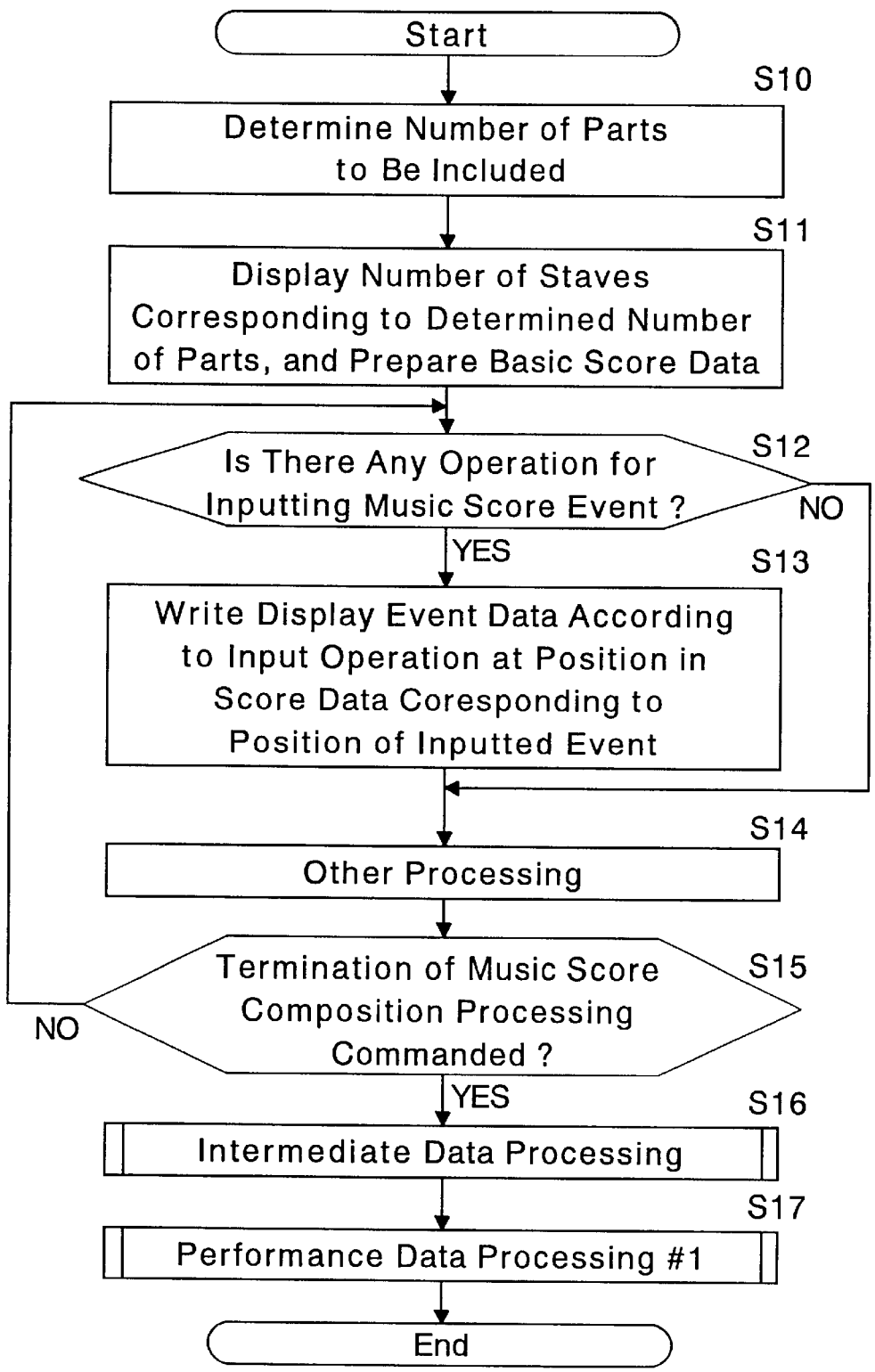

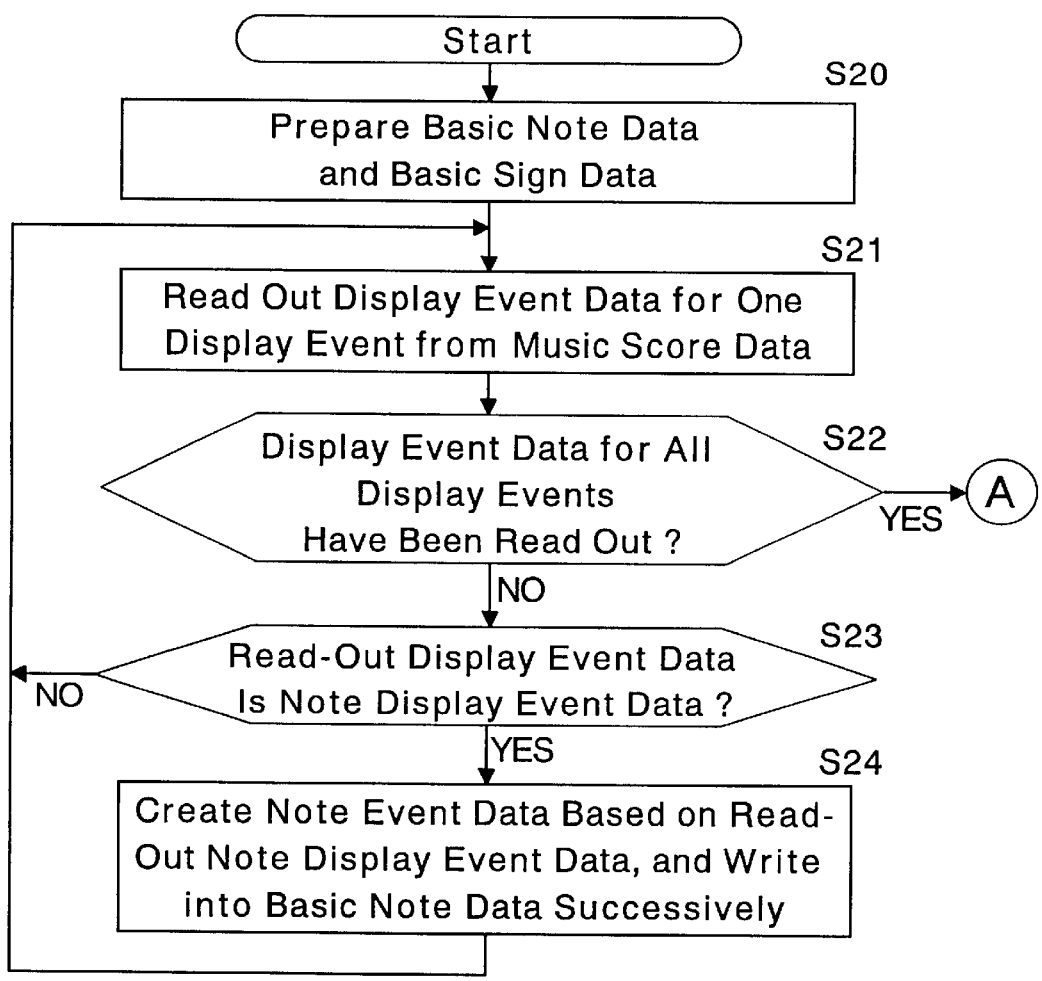
Fig.8a Intermediate Data Processing

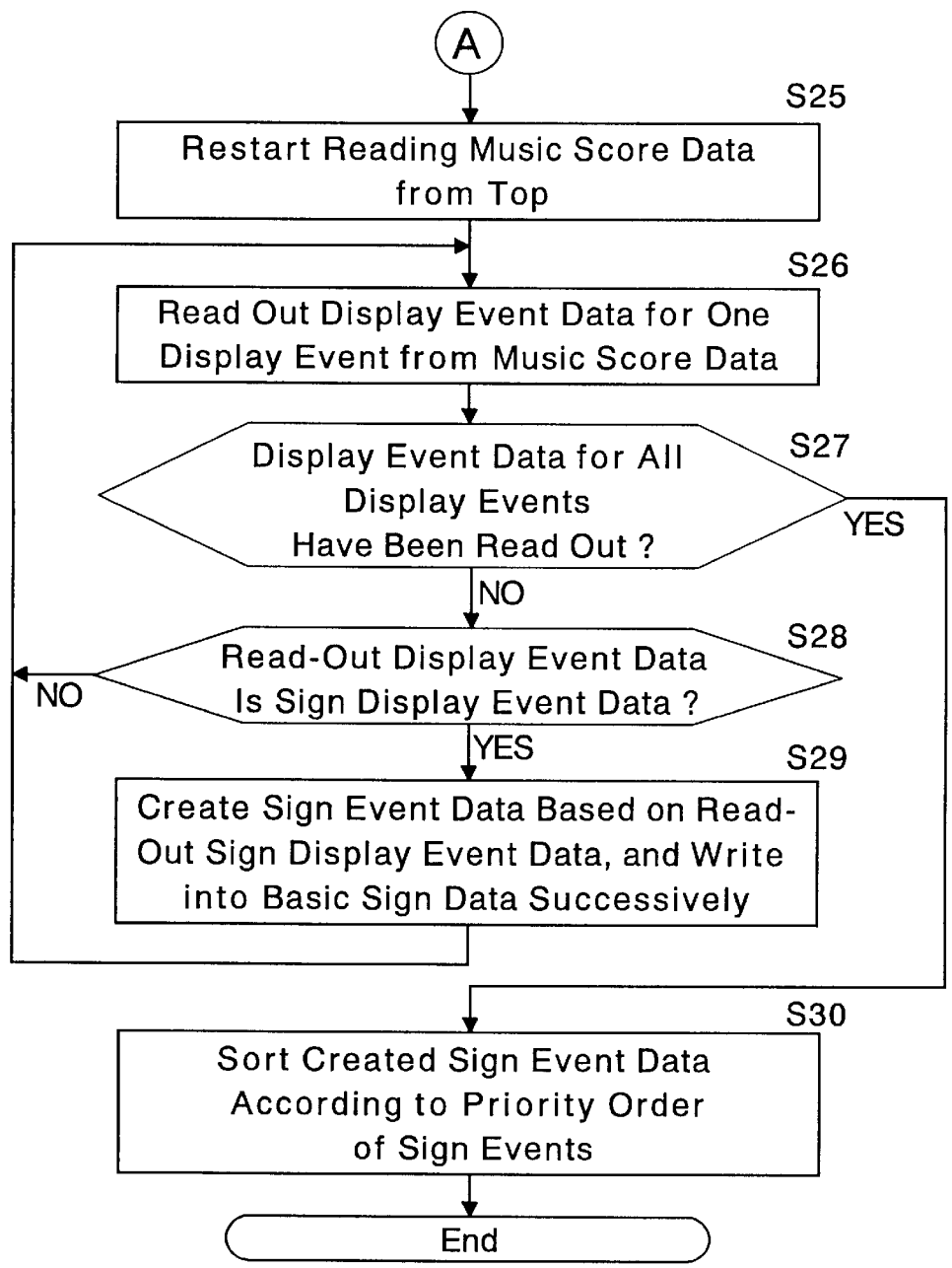
*Fig.8b Intermediate Data Processing*

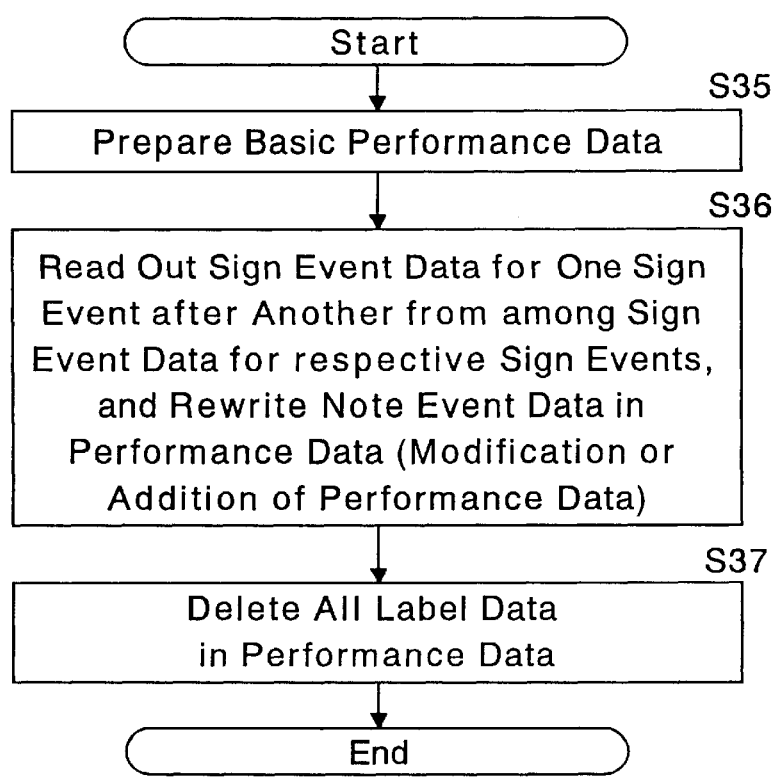
Fig.9 Performance Data Processing #1

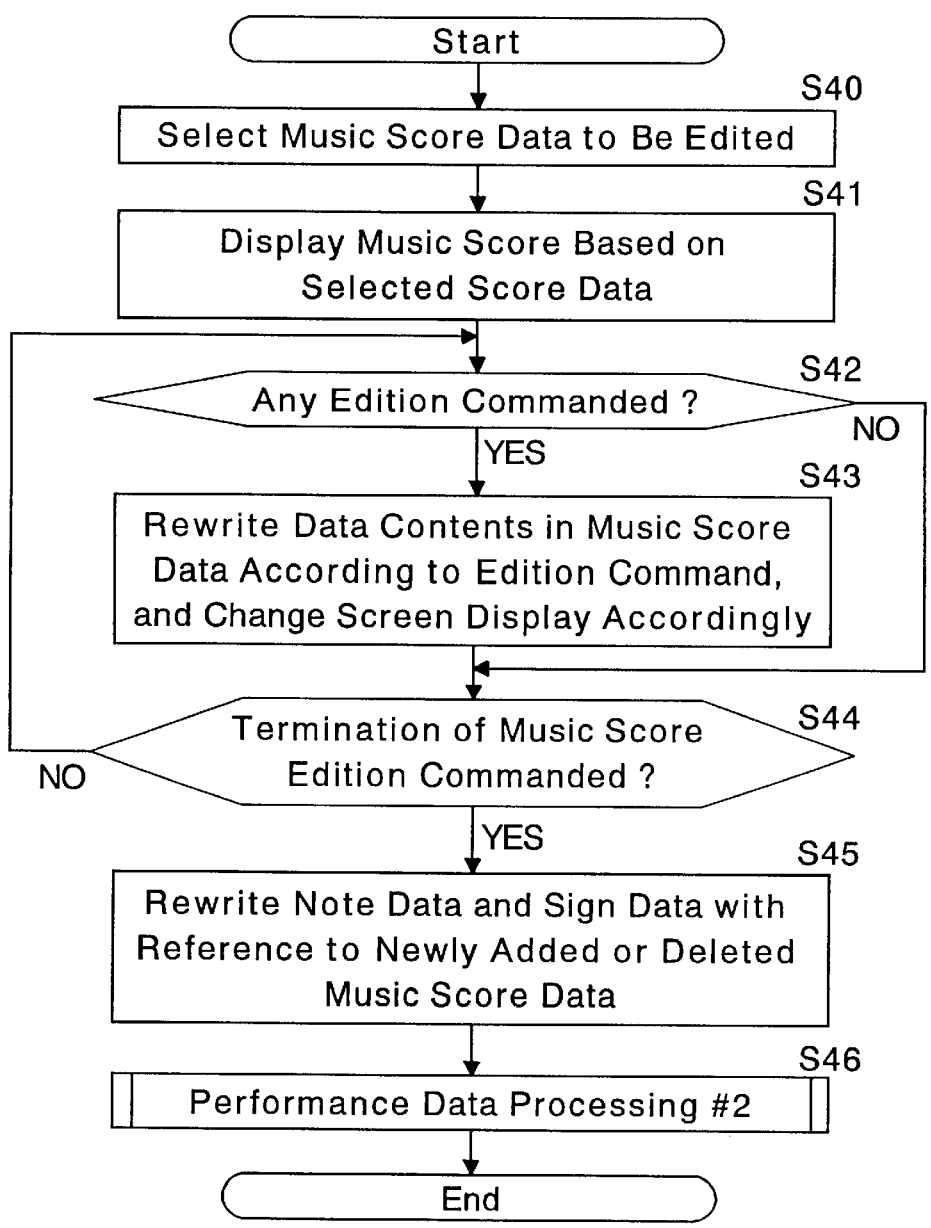

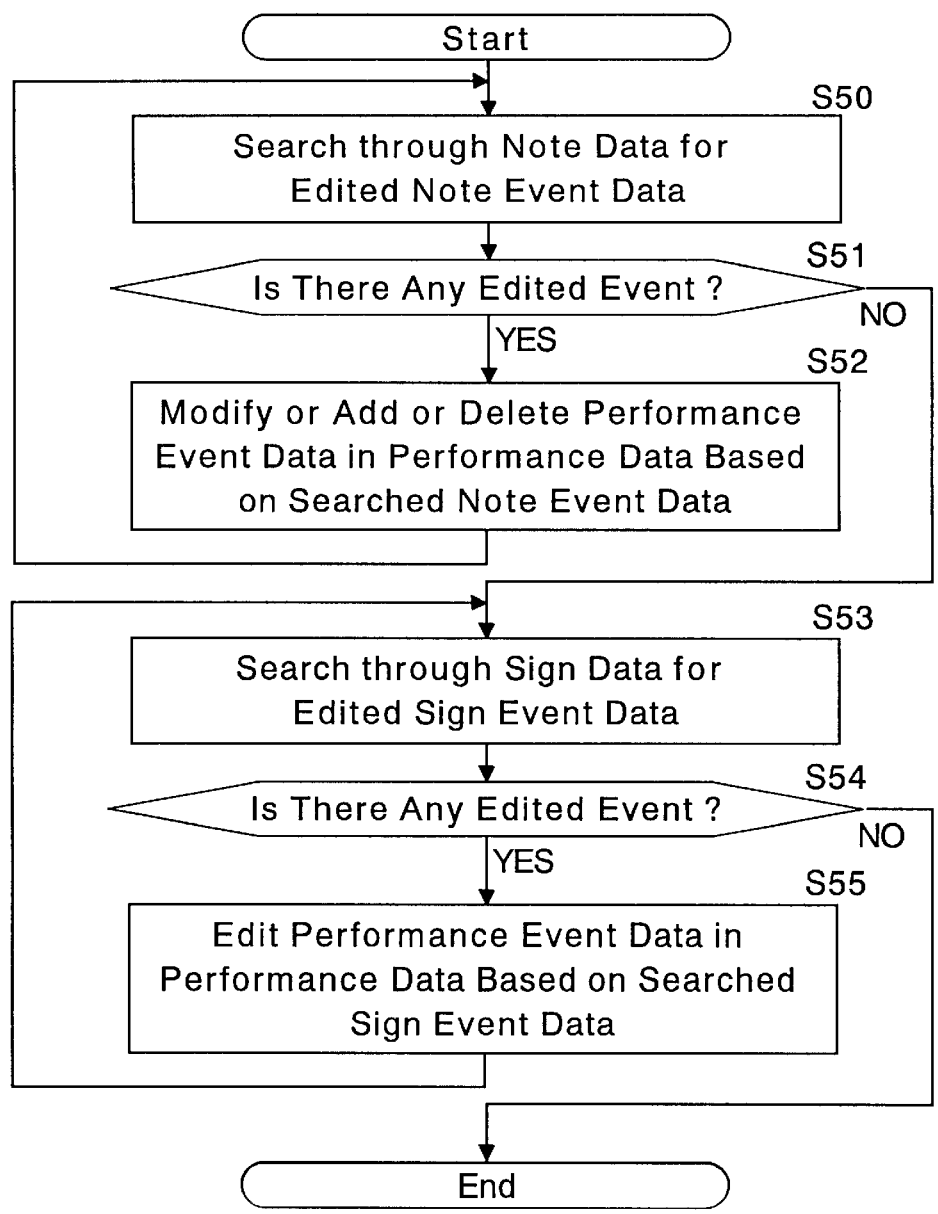
Fig.11 Performance Data Processing #2

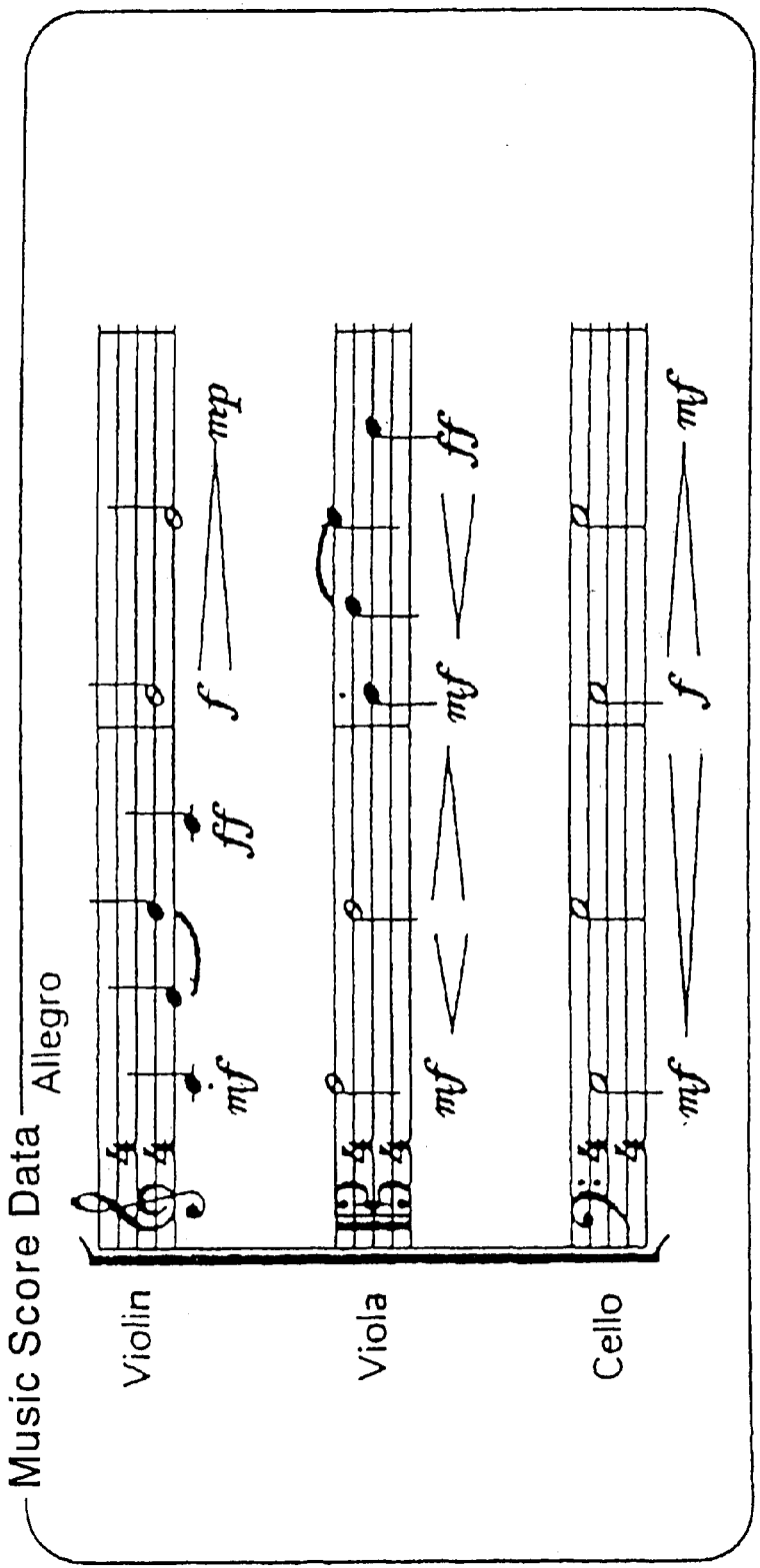
*Fig.12a Before Edition*

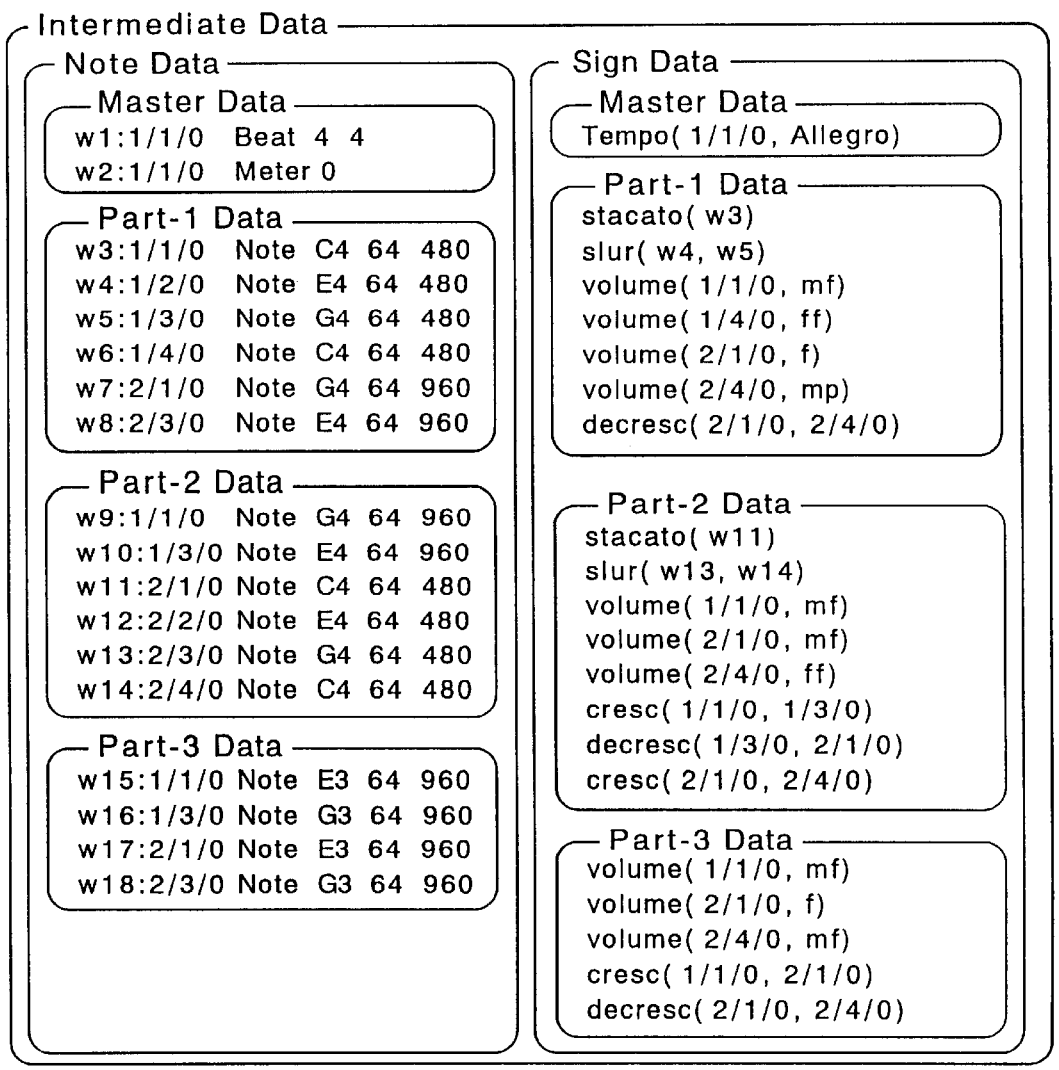
Fig.12b  Before Edition

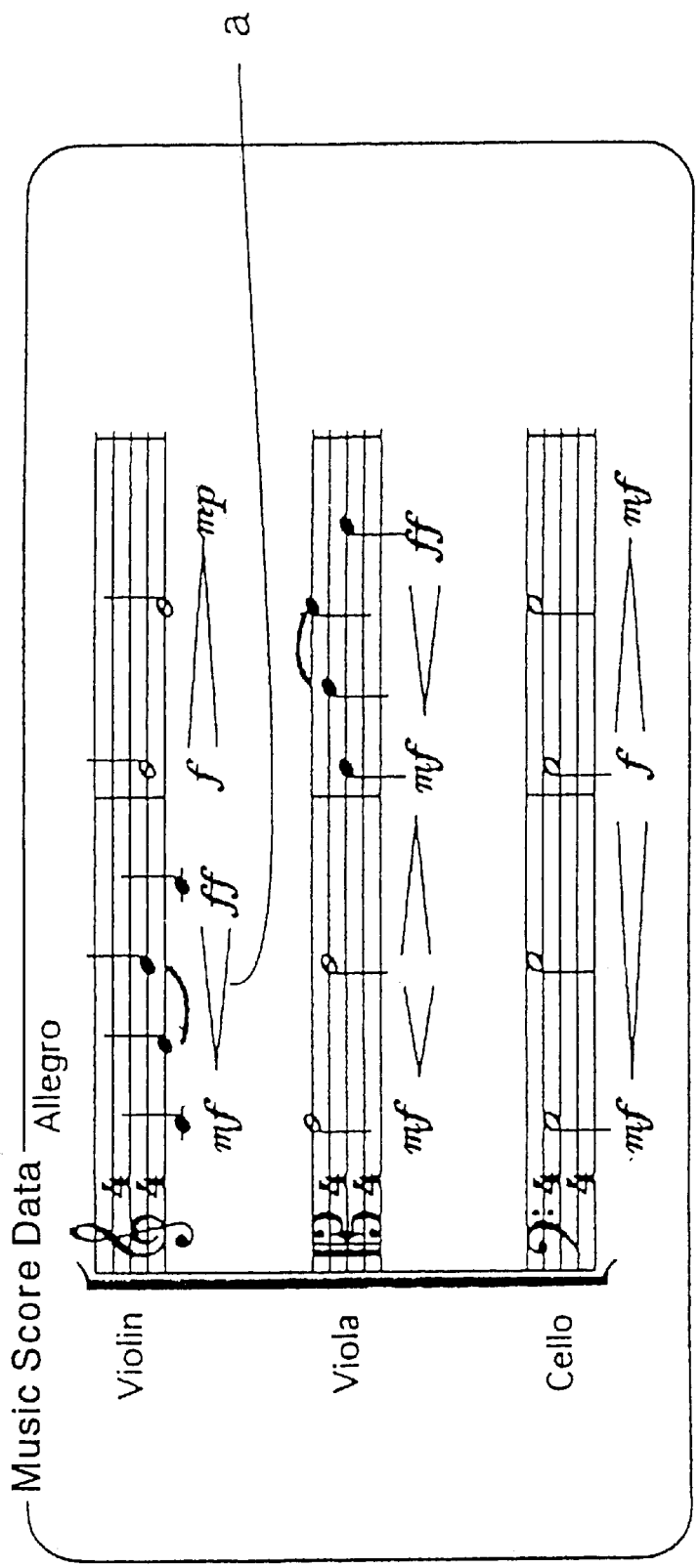
Fig.13a After Edition

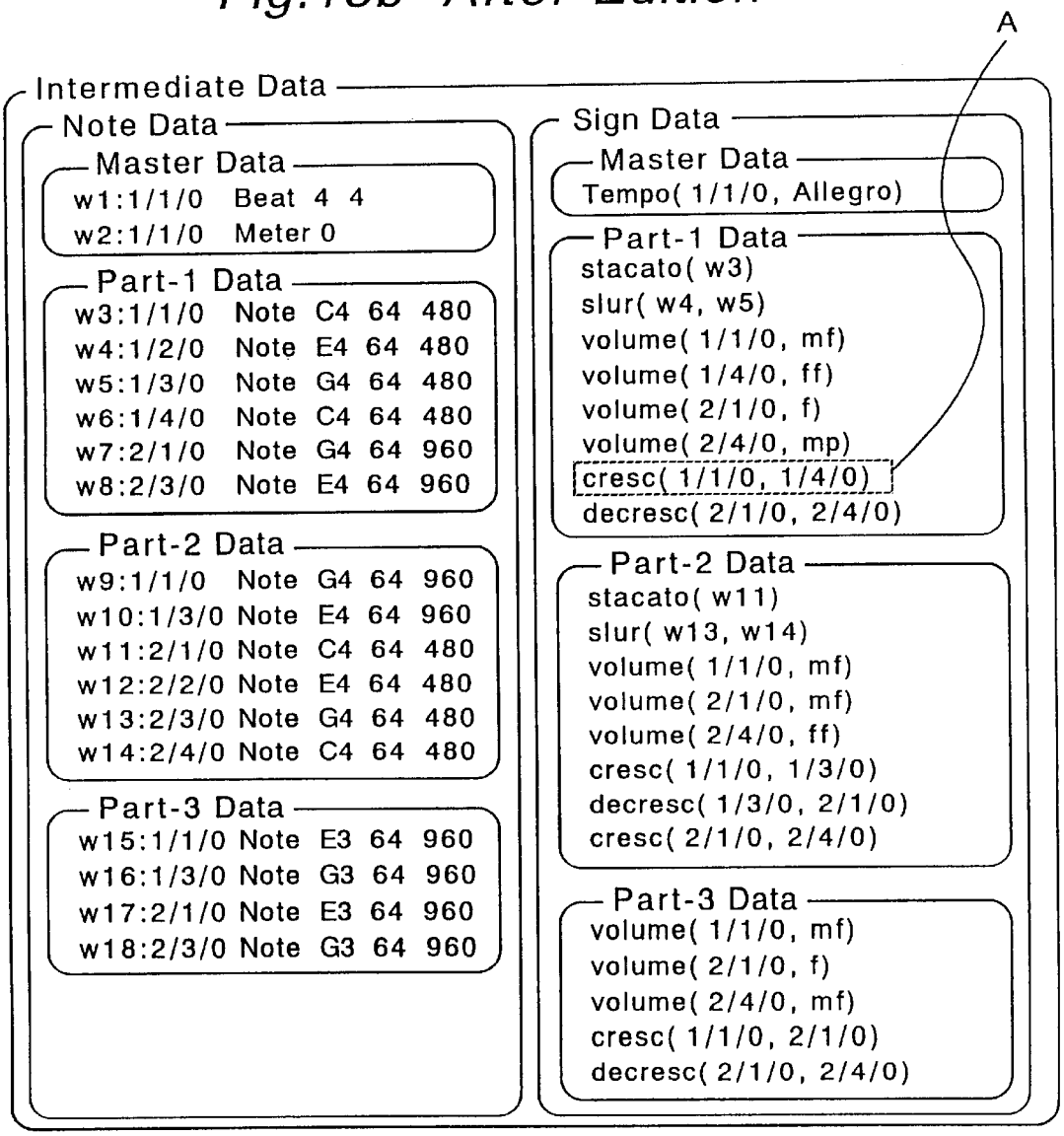
Fig.13b  After Edition

APPARATUS AND METHOD FOR EDITING A MUSIC SCORE BASED ON AN INTERMEDIATE DATA SET INCLUDING NOTE DATA AND SIGN DATA

BACKGROUND OF THE INVENTION

1. Field of the Invention

The present invention relates to an apparatus and a method for editing a music score, and more particularly to such an apparatus and a method processing a music score data set including information to display a music score in musical notation, a performance data set including information to perform a piece of music as defined by the music score, and an intermediate data set including information to mediate between the music score data set and the performance data set and to reflect edition of the music score data set into the performance data set, so that the performance data set is efficiently composed reflecting the edition on to the music score data set.

2. Description of the Prior Art

There has conventionally been known in the art an apparatus of a data processing type which displays a music score on the display screen based on music score data and prints the music score on paper in the style exhibited on the screen. In such an apparatus, icons of various kinds of notes and of various kinds of musical signs (or symbols) are to be arbitrarily inputted using an input device such as a keyboard utilizing the data processing technology.

There has also been known in the art an apparatus of a data processing type which converts the music score data for screen display into performance data for driving a tone generating module such as a MIDI apparatus to perform music. A music score contains icons or symbols of various notes and various other signs located at respective determined positions on the five-line staves, and the music score data for exhibiting a visual image of a music score on the display screen contains display position data, note type data and sign type data to place the note symbol images and various sign symbol images at the respective proper positions on the screen. The apparatus, therefore, builds performance data from the music score data by utilizing such various data elements in the music score data.

The music score data, however, are data for the purpose of displaying musical notations on a screen plane and, therefore, do not contain data concerning the progression of time. For this reason, the production of performance data from music score data inevitably requires the formation of a whole performance data covering from the top through to the tail of the score data. In case a portion or portions of the score data is or are edited, the conversion from the score data into the performance data will necessitates complete amendment of the performance data from its beginning to end corresponding to the whole length of the partly edited score data, and not a partial amendment of the edited performance data. This makes the performance data producing work after the score edition inefficient, and requires much time after the edition of the music score data.

SUMMARY OF THE INVENTION

It is, therefore, a primary object of the present invention to solve the above-mentioned drawbacks involved in such a conventional apparatus or method of editing music score data and producing performance data by introducing intermediate data which will permit a partial adjustment of the performance data according to a partial edition to the music score data where the performance data is produced based on the music score data, thus eliminating an annoying multiplicative amount of work for complete production again from the beginning to the end of the performance data.

In order to accomplish the object of the present invention, the invention provides a music score editing apparatus comprising: a music score data composing module which composes a music score data set including display event data that define notes and signs in musical notation and respective positions of the notes and signs for displaying a music score in a form of musical notation; an intermediate data creating module which creates an intermediate data set corresponding to the music score data set, the intermediate data set including a note data set which contains note event data corresponding to the notes and their respective positions, and a sign data set which contains sign event data corresponding to the signs and their respective positions; and a performance data creating module which creates a performance data set corresponding to the intermediate data set, the performance data set including performance event data that define notes to be played in terms of at least pitches and generation times of the respective notes to perform a musical piece as defined by the music score data set.

The note event data may contain identifying information for identifying each note event among the plural note events, and note event data for each note may include at least note generation time information, note pitch information and note duration information. The sign event data may contain program indicating information for indicating the processing program for the respective signs and parameter information to be used under the processing program, and may be stored in a predetermined priority order.

According to the present invention, an intermediate data set containing note event data for each of the note events and sign event data for each of the sign events is created based on the music score data set, and then a performance data set containing performance event data for each of the performance events based on the note event data and the sign event data in the intermediate data set. Therefore, when notes or signs are edited in the music score data set, the associated note event data and sign event data are edited in the intermediate data set, and the performance data set is edited at portions therein which are respectively associated with the edited portions of the intermediate data set to finally obtain an edited performance data set. Thus, the burden in the edition processing of a performance data set caused by edition on to a music score data set will be alleviated, thereby realizing efficient edition processing in a short time when processed using a personal computer or like apparatuses.

As will be understood from the above description about the apparatus for editing a music score data set, a sequence of steps each performing the operational function of each of the structural element modules of the above music score editing apparatus will constitute an inventive method for editing a music score data set according to the spirit of the present invention.

Further as will be understood from the above description about the apparatus and the method for editing a music score data set, a storage medium containing a program executable by a computer system, which program comprising program modules for executing a sequence of the processes each performing the operational function of each of the structural element modules of the above music score editing apparatus or performing each of the steps constituting the above music score editing method will reside within the spirit of the present invention.

Further as will be apparent from the description herein later, some of the structural element modules of the present invention are configured by a computer system performing the assigned functions according to the associated programs. They may of course be hardware structured discrete devices performing the same functions.

The present invention may take form in various components and arrangement of components including hardware and software, and in various steps and arrangement of steps. The drawings are only for purposes of illustrating a preferred embodiment and processes, and are not to be construed as limiting the invention.

BRIEF DESCRIPTION OF THE DRAWINGS

For a better understanding of the present invention, and to show how the same may be practiced and will work, reference will now be made, by way of example, to the accompanying drawings, in which:

FIGS. 2a and 2b are data configuration charts showing examples of a music score data set before and after an edition according to the present invention, respectively;

FIG. 3 is a data configuration chart showing an example of a note data set processed in the present invention;

FIGS. 4a and 4b are data configuration charts showing examples of a sign data set before and after an edition according to the present invention, respectively;

FIGS. 5a and 5b are data configuration charts showing examples of a performance data set before and after an edition according to the present invention, respectively;

FIG. 5c is a graph showing an example of the volume variation with respect to time progression in the case of the performance data set of FIG. 5b;

FIG. 6 is a flow chart showing an example of main routine processing for editing a music score data according to the present invention;

FIG. 7 is a flow chart showing an example of subroutine processing for composing a music score data set as executed in the main routine processing of FIG. 6;

FIGS. 8a and 8b are, in combination, a flow chart showing an example of subroutine processing for handling an intermediate data set as executed in the processing of FIG. 7;

FIG. 9 is a flow chart showing an example of subroutine processing for handling a performance data set as executed in the processing of FIG. 7;

FIG. 10 is a flow chart showing an example of subroutine processing for editing a music score data set as executed in the main routine processing of FIG. 6;

FIG. 11 is a flow chart showing an example of subroutine processing for handling a performance data set as executed in the processing of FIG. 10;

FIGS. 12a and 12b are examples of display screen images showing a music score and an intermediate data set, respectively, before edition according to the present invention; and FIGS. 13a and 13b are examples of display screen images showing a music score and an intermediate data set, respectively, after edition according to the present invention.

DESCRIPTION OF THE PREFERRED EMBODIMENTS

Figure 1:
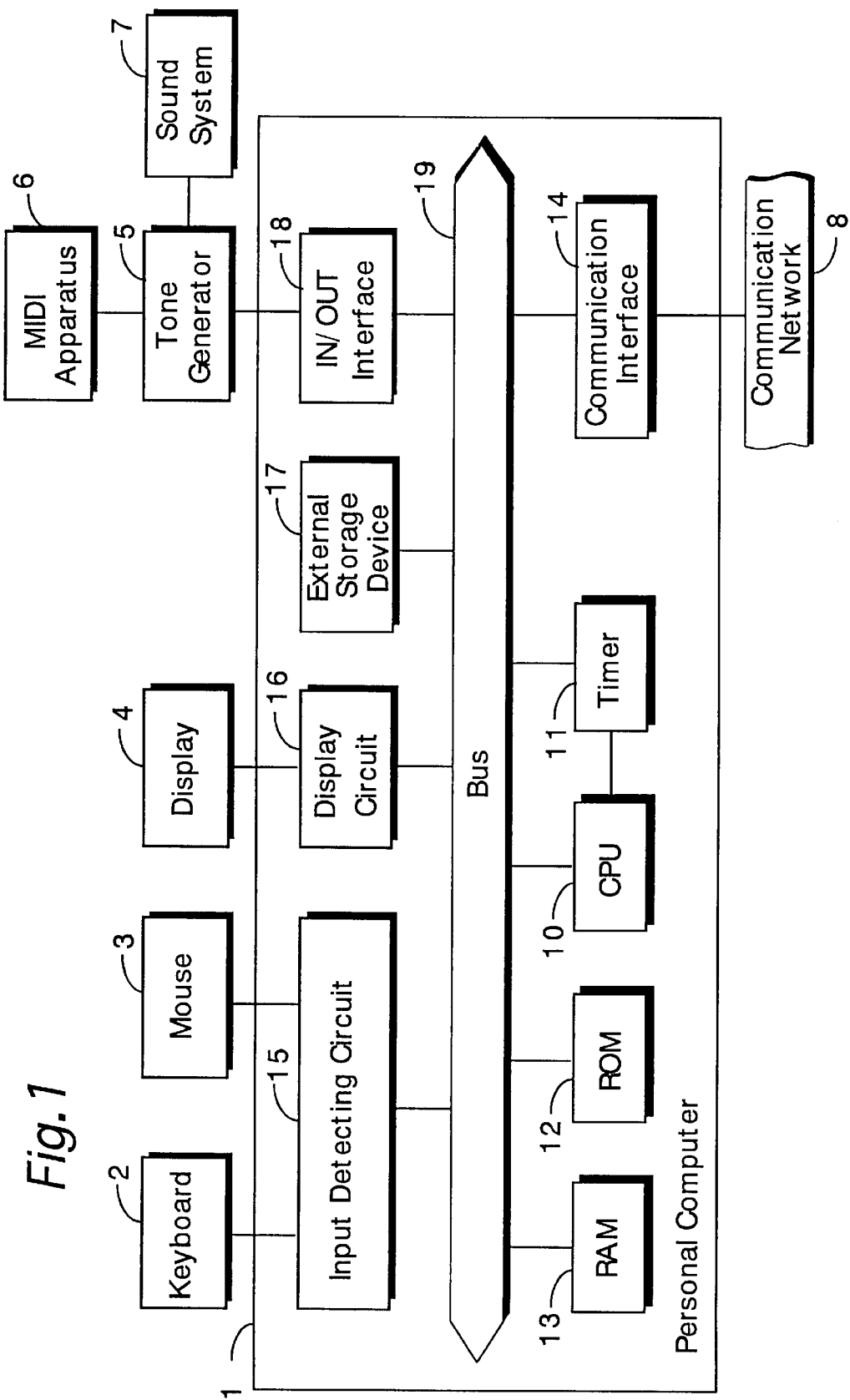
FIG. 1 is a block diagram showing a hardware structure of an example of a music score editing apparatus executing a music score editing program according to the present invention.

FIG. 1 shows a general block diagram of an example of the hardware structure of a music score editing apparatus which executes an embodiment of the music score edition program according to the present invention.

Referring to FIG. 1, a personal computer 1 constitutes a core configuration of a music score editing system according to the present invention, and includes a CPU (central processing unit) 10, a timer 11, a ROM (read only memory) 12, a RAM (random access memory) 13, a communication interface 14, an input detecting circuit 15, a display circuit 16, an external storage device 17 and an IN/OUT interface, all being interconnected by means of bus lines 19. The CPU is to control various operations in the personal computer 1. The timer 11 counts the time lapse during the operation and generate timer interruption pulses at predetermined time intervals and is used in the time administration in the automatic performance and in the control of envelopes and various tone effects. The ROM 12 stores a music score edition program according to the present invention or an automatic performance program containing the music score edition program therein and other programs and data to be used in the data processing according to the present invention. The RAM 13 serves as storage areas for a music score data set, an intermediate data set containing note data and sign data, a created performance data set, and also as work areas for the CPU 10.

The communication interface 14 is to connect the computer system 1 to the communication network 8 such as a LAN (local area network) like Ethernet, Internet and telephone lines to access out source server computers. Application software such as the music score edition program of the present invention and various data can be transmitted through the communication net work 8 to and from the outside computers. The input detecting circuit 15 detects the operations (actuations) of a key 2 and a mouse 3 connected the personal computer 1 for inputting operational commands by the user and sends the detected signals to the bus 19. The keyboard 2 includes a number of keys for use with a personal computer and the mouse 3 is a pointer device for moving the pointer mark on a display screen 4. The display circuit 16 converts digital displaying signals into analog displaying signals for displaying necessary images on the screen 4 during processing and transfers the converted analog signals to the display device 4. The display screen 4 provides various windows in order to permit various settings and to exhibit a music score or data lists while the music score edition program of the present invention is running.

The external storage device 17 is available for storing various application programs including the music score edition program and various data, and may be constituted by employing an HDD (hard disk drive), an FDD (floppy disk drive), a CD-ROM drive, an MO (magneto-optical disk) drive, a DVD (digital versatile disk) drive, etc. The in/out interface 18 is to transmit performance data in a MIDI format as created from the music score data to and from a tone generator 5. The tone generator 5 is to generate tone signals based on the tone generation control data for a plurality of tone generation channels as stored in the tone generation registers and to impart to the generated tone data various sound effects such as reverberation, chorus, variations, etc. based on effect control data. A MIDI apparatus 6 connected to the tone generator 5 may be a sequencer or an electronic musical instrument of a MIDI capability, or other MIDI apparatuses. A sound system 7 connected to the other tone generator 5 is to amplify the analog-converted tone signals from the tone generator 5 and to emit audible sounds into atmosphere.

The above described hardware structure is of a similar configuration to a personal computer and a work station. The music score edition program of the present invention may be contained in another program such as an automatic performance program and may be started at the time when edition of the created or stored music score data is intended. For example, with the hardware structure of FIG. 1, placing the pointer on to the indication "Edit" in the menu displayed on the screen 4 when the automatic performance program is started, the user clicks the mouse 3, then the music score edition program will be started to make the edition of a music score data available. The outline of the music score edition will be described, referring to FIGS. 2a and 2b which show the data structure of examples of a music score data set, FIG. 3 which shows the data structure of an example of a note data set contained in an intermediate data set, FIGS. 4a and 4b which show the data structure of examples of a sign data set contained in the intermediate data set, FIGS. 12a and 12b which show a music score and an intermediate data set, respectively, as displayed on the screen 4 before edition, and FIGS. 13a and 13b which show a music score and an intermediate data set, respectively, as displayed on the screen 4 after edition.

Suppose there is presented on the screen 4 in the hardware configuration of FIG. 1 a music score as shown in FIG. 12a. In the following explanation, the duration (time length) of a quarter note is defined to be 480 clocks (counts in timing pulse). The music score may be the one exhibited when a music score data set is composed using a software which permits the music score data composition, or may be the one exhibited when a music score data set is read out from an external storage device 17. In any event, the music score data set is stored in the RAM 13 while a music score is being displayed on the screen 4. The music score editing apparatus of the present invention creates a MIDI formatted performance data set from the music score data set for the display. In the course of the processing, an intermediate data set containing a note data set and a sign data set as shown in FIG. 12b is created from the music score data set, and the created note data set and sign data set are stored in the RAM 13 at the areas secured for them, respectively. The note data set of the intermediate data set is constituted by general setting data (master data) for setting general matters covering the whole music piece (or song) and note event data blocks for the respective performance parts created from the notes in the musical notation on the displayed music score. The general setting data include information about the musical piece identification, the performance part structure and the time signature. The note event data for each note event includes information about each note event in the music score and is given a label for identification, thereby providing one event data pack per one note. The note event data is in the MIDI format.

The sign data set of the intermediate data set is constituted by general setting data (master data) for setting general matters covering the whole music piece (or song) and sign event data blocks for the respective performance parts created from the signs in the musical notation on the displayed music score. The general setting data include information about the musical piece identification, the performance part structure and the tempo for the music progression. The sign data for each sign event includes program indication data which indicates a program of processing for the assigned sign and parameter data which is to be used by the indicated program. The numerical values such as "480" and "960" shown at each line for each note event data included in each performance part in the intermediate data set of FIG. 12b and of FIG. 13b are step times representing the respective note duration (or note time length), i.e. kinds of notes (e.g. a quarter note or a half note).

FIG. 2a shows the data structure of the music score data set (stored in the RAM 13) of the music score which is displayed in the music score area on the screen 4 as shown in FIG. 12a. The music score data set includes general setting data for setting general matters covering the whole music piece (or song) and display event data blocks for the respective performance parts. The general setting data in the example shown in FIG. 2a indicate that the musical piece is named "Song 1 " of a 3-part structure in a four-quarter time and in an allegro tempo. According to these data, musical notations will be displayed at the respectively determined positions on the score as shown in FIG. 12a, with respect to the set part-structure, time signature and tempo indication. Each pack of display event data in each performance part consists of display event information about the kind of note or sign to be displayed and display position information about the position to place such a note or a sign on the score.

More specifically, the event data pack for the first display event in part 1 means that the display position is "A" and the display event is of a note having a pitch (note number) of C4 (261.626 Hz) and a duration of quarter note. According to these data for the display event, the first quarter note in the first part (violin) is displayed at the pitch position of C4 (first ledger line below five-line stave) at the time position "A" (as in FIG. 12a). The next pack of display event data defines that the display position is "A" and the display event is of a sign "staccato" and accordingly a staccato mark (dot) is added to the quarter note displayed at position "A" (as in FIG. 12a). The third pack of display event data indicates that the display position is "A" and the display event is of a sign "mezzo forte (mf)" and accordingly a mezzo forte sign (mf) is placed near the quarter note displayed at position "A" (as in FIG. 12a). The fourth pack of display event data tells that the display position is "B" and the display event is of a note having a pitch of E4 (329.628 Hz) and a duration of quarter note. According to these data for the display event, the second quarter note in the first part is displayed at the pitch position of E4 (first line of five-line stave). The fifth pack of display event data shows that the display position is "B" and the display event is of a slur up to the position "C" and accordingly a slur mark is placed bridging the quarter note at position "B" and the quarter not position "C" (as in FIG. 12a).

The sixth pack of event data indicates that the display position is "C" and the display event is of a note having a pitch of G4 (391.995 Hz) and a duration of quarter note. According to these data for the display event, the third quarter note in the first part is displayed at the pitch position of G4 (second line of five-line stave) at the time position "C" (as in FIG. 12a). The seventh pack of display event data indicates that the display position is "D" and the display event is of a note having a pitch of C4 and a duration of quarter note. And thus the fourth quarter note in the first part is displayed at the pitch position of C4 at the time position "D" (as in FIG. 12a). The eighth pack of event data indicates that the display position is "D" and the display event is of a sign "fortissimo" and accordingly a fortissimo sign (ff) is placed near the quarter note displayed at position "D" (as in FIG. 12a). The succeeding packs of event data (although not shown in FIG. 2a) will cause the corresponding displays on the score accordingly, as will be understood by those skilled in the art. Further, the display event data in other performance parts are interpreted and displayed in a similar fashion, successively, to display all necessary notations on the score before arriving at the end data.

Thus, there are two kinds of display event data, the note event data for displaying musical note marks (symbols) and the sign event data for displaying musical sign marks (symbols), and these display event data are stored in the secured area of the RAM 13 in the order of performance time positions. In case there are plural display events at the same performance time position, the note event data is stored prior to the sign event data.

FIG. 3 shows the data structure of a note data set among the intermediate data sets created from the music score data set and stored in the RAM 13. The note data set is created based on the note display event data (which cause the notes to be displayed on the music score) in the music score data set shown in FIG. 2a, and includes, as shown in FIG. 3, general setting data and note event data in each of the performance parts. The note event data are stored in the order of occurrence in a performance, and each note event data is in a MIDI format, and is also given a unique label to distinguish one note event from another.

The note data set of FIG. 3 contains specific note event data which are created based on the specific note display event data in the music score data set shown in FIG. 2a. Among the note event data of performance part 1, the first note event data pack is given a label "1" and contains a tone generation time point "A", a note number "C4", a velocity value "64" and a tone duration (gate time) "360" in a MIDI format. The second note event data is given a label "2" and contains a tone generation time point "B", a note number "E4", a velocity value "64" and a tone duration (gate time) "360" in a MIDI format. The third note event data is given a label "3" and contains a tone generation time point "C", a note number "G4", a velocity value "64" and a tone duration (gate time) "360" in a MIDI format. The fourth note event data pack is given a label "4" and contains a tone generation time point "D", a note number "C4", a velocity value "64" and a tone duration (gate time) "360" in a MIDI format.

Although the remaining data are omitted, it will be understood that the data correspond to the music score of FIG. 12a. After the note event data of the performance part #1 are stored the note event data of the performance part #2, and then the note event data of further succeeding parts, one part after another successively as far as parts exist, and finally end data is stored. In this way, the note event data are stored in the storage area of the RAM 13, part by part, in the order of occurrence in the performance. The labels attached to the respective note event data are to be utilized for referring to particular note event data in the processing of sign data as will be described hereinafter.

FIG. 4a shows the data structure of a sign data set among the intermediate data sets created from the music score data set and stored in the RAM 13. The sign data set is created based on the sign display event data (which cause the signs to be displayed on the music score) in the music score data set shown in FIG. 2a, and includes, as shown in FIG. 4a, general setting data and sign event data in each of the performance parts. The sign event data are stored according to a predetermined priority order, and each sign event data includes program indication data (in FIG. 4a, the names of signs are described for clarity) for indicating the program used for processing this each sign event data and includes parameter data representing parameters to be used in the indicated program, wherein the respective parameters are referred to by the label names given to the above described note event data.

The sign data set of FIG. 4a contains specific sign event data which are created based on the specific sign display event data in the music score data set shown in FIG. 2a. Among the sign event data of performance part 1, the first sign event data pack has program indication data of "staccato" and parameter data of "label 1", meaning that the staccato processing is conducted using the note event data having the label "1" in the note data set.

The second sign event data pack has program indication data of "slur" and parameter data of "label 1" and "label 2", meaning that the slur processing is conducted using the note event data having the label "1" and the note event data having the label "2" in the note data set. The third sign event data has program indication data of "volume (mezzo forte)" and parameter data of "label 1", meaning that the volume processing is conducted using the note event data having the label "1" in the note data set. The fourth sign event data has program indication data of "volume (fortissimo)" and parameter data of "label 4", meaning that the volume processing is conducted using the note event data having the label "4" in the note data set.

Although the remaining data are omitted, it will be understood that the data correspond to the music score of FIG. 12a. After the sign event data of the performance part #1 are stored the sign event data of the performance part #2, and then the sign event data of further succeeding parts, one part after another successively as far as parts exist, and finally end data is stored.

In this way, the sign event data are stored in the storage area of the RAM 13, part by part, in the predetermined priority order. The priority order means the order of conducting processing in such a way that, for example, the processing for modifying the tone generation time points and the processing for modifying the tone duration (gate time) will be conducted prior to the processing for modifying the volume (velocity), i.e. the former have a higher priority than the latter. More specifically, the processing for staccato is conducted prior to the processing for mezzo forte. Further, the processing for a single note are conducted prior to the processing for multiple notes. Further, the processing for crescendo is conducted prior to the processing for mezzo forte. This is because the processing for sign event data should be conducted in the order determined according to the kind of the sign and not in the order of time progression to obtain adequate results. The data are stored in the RAM 13 in such a predetermined priority order.

FIG. 5a shows the data structure of a performance data set created from the note data set shown in FIG. 3 and the sign data set shown in FIG. 5a among the intermediate data sets. The performance data set of FIG. 5a is created by executing the sign processing on to the note data set shown in FIG. 3 according to the sign event data in the sign data set shown in FIG. 4a, and includes, as shown in FIG. 5a, general setting data and performance event data in each of the performance parts. The performance event data are stored in the order of occurrence in a performance, and each performance event data is in a MIDI data format.

The performance data set of FIG. 5a contains specific performance event data which are created by applying sign processing on to the specific note event data in the note data set shown in FIG. 3 according to the specific sign event data in the sign data set shown in FIG. 4a. Among the performance event data of performance part 1, the first performance event data pack corresponds to the note event data as labeled "1" and contains a tone generation time point "0", a note number "C4", a velocity value "80" and a tone sounding duration (gate time) "240" in a MIDI format. What should be noted here is that the note sounding duration is shortened to "240" as compared with the duration value "360" of the note event data which is labeled "1" as a result of staccato processing on to the note event data. Also to be noted is that the velocity value is increased to "80" as compared with the velocity value "64" of the same note event data which is labeled "1" as a result of volume processing (mezzo forte processing) on to the note event data.

The second performance event data corresponds to the note event data which is labeled "2" in the note data set of FIG. 3 and contains a tone generation time point "480", a note number "E4", a velocity value "64" and a tone duration (gate time) "480" in a MIDI format. It should be noted here that the tone generation time point is made "480" being calculated from the tempo value in the general setting data and the accumulated note length of all the note events before the start of this note event (i.e. note time position from the beginning of the part 1). Also to be noted is that the tone sounding duration (gate time) is increased to "480" as compared with the duration value "360" of the note event data which is labeled "2" as a result of slur processing on to the note event data. The third performance event data corresponds to the note event data which is labeled "3" in the note data set of FIG. 3 and contains a tone generation time point "960", a note number "G4", a velocity value "64" and a tone sounding duration (gate time) "360" in a MIDI format. The tone generation time point "960" is calculated from the tempo value in the general setting data and the accumulated note length of all the note events before the start of this note event.

The fourth performance event data pack corresponds to the note event data which is labeled "4" in the note data set of FIG. 3 and contains a tone generation time point "1440", a note number "C4", a velocity value "110" and a tone sounding duration (gate time) "360" in a MIDI format. The tone generation time point "1440" is calculated from the tempo value in the general setting data and the accumulated note length of all the note events before the start of this note event. The velocity value is increased to "110" as compared with the velocity value "64" of the note event data which is labeled "4" as a result of fortissimo processing on to the note event data.

Although the remaining data are omitted, it will be understood that the data correspond to the music score of FIG. 12a. After the performance event data of the performance part #1 are stored the performance event data of the performance part #2, and then the performance event data of further succeeding parts, one part after another successively as far as parts exist, and finally end data is stored. The performance event data are stored in the RAM 13 as grouped in performance parts and in the order of occurrence in the performance in each part.

The above description has been about the creation of the performance data set from the composed music score data set representing the music score displayed on the display screen 4. In the following will be made a description about how an edited performance data set is obtained from an edited music score data set, when the user edits the music score displayed on the screen 4. For the sake of simplicity, the description will be made with respect to the case where a crescendo sign is provided over the four notes in the first measure of part 1 (violin) of the music score of 12a to make a music score as shown in FIG. 13a.

In order to edit the music score shown in FIG. 12a to make the music score as shown in FIG. 13a by adding a crescendo sign through the four notes in the first measure of part 1 (violin), the user is requested to put an icon of "crescendo" on to the intended position of the displayed music score as shown by the reference character "a" in FIG. 13a. In response to this operation, a sign event data pack A representing a crescendo mark is inserted in the part 1 data area of the sign data subset of the intermediate data set as shown in FIG. 13b. More specifically, a display event data pack is added to the music score data set as referenced by the character "a" in FIG. 2b. The added display event data means a display position "A" and a display event of "crescendo up to the display position D"

As the music score data set is edited, the intermediate data set is edited accordingly as explained above. In the above example, the edition is about only the addition of a crescendo sign, and therefore only the sign data set among the intermediate data set is edited. Specifically speaking, the note data set is not edited, but only the sign data set is edited from FIG. 4a to FIG. 4b with the addition of a sign event data pack A as shown. The added sign event data A means a sign event of volume processing having indications of "volume (crescendo)" and parameters of "label 1–label 4" covering four notes, and is placed after the sign event data of "volume (fortissimo)" processing labeled "4" in view of the predetermined priority orders among sign event processings.

Thus, the performance data set is edited in accordance with the edition on to the sign data set. In this processing, the performance event data in the performance data set (before edition) is modified, added or deleted in correspondence to the edited sign data set. In the above example, the volume processing is effected to gradually increase the volume from the volume of "mezzo forte" at the note event labeled "1" through to the volume of "fortissimo" at the note event labeled "4".

Specifically, the performance data set obtained after the edition includes volume increasing event data distributed among the performance event data corresponding to the note event data labeled "1" through "4" as shown by the portion A' in FIG. 5b. Namely, the performance event data corresponding to the note event data labeled "1" assumes, being unchanged, the tone generation time point "0", the note number "C4", the velocity "80" and the tone sounding duration "240", but new performance event data is added thereafter to mean a volume increase of "+5" at the performance time point "240".

The next performance event data corresponding to the note event data labeled "2" is modified to assume the tone generation time point "480", the note number "E4", a velocity "80", the tone sounding duration "480" and a volume "5". Next, new performance event data is added meaning a time point "720" and a volume "5". Further, the performance event data corresponding to the note event data labeled "3" is modified to have the tone generation time point "960", the note number "G4", a velocity "80", the tone sounding duration "360" and a volume "+5". Thereafter is added new performance event data meaning a time point "1200" and a volume "+5". Further, the performance event data corresponding to the note data labeled "4" is modified to have the tone generation time point "1440", the note number "C4", a velocity "80", the tone sounding duration "360" and a volume "+5". As a result, the volume at the performance event time point of the note labeled "4" has been accumulated to be "110" meaning a fortissimo.

In the edited performance data set, therefore, there are performance event data of increasing the volume by "+5" at every time point of "240" interval. The performance volume is accordingly increased gradually to become "110" at the time point "1440". This is the crescendo processing for increasing the tone sounding volume (intensity) from the mezzo forte volume at the note event labeled "1" to the fortissimo volume at the note event labeled "4".

The volume data indicating the gradual increase of the volume by the step of "+5" correspond to the expression data in the MIDI signals meaning a kind of message of a control change with respect to the volume control. The volume of the notes in this part (part 1) is controlled by the velocity value and the volume data. At the time point "0", the velocity value is "80" and the volume data is "0", and the sum total is "80" accordingly. At the time point "240", the velocity value stays "80" and the volume data becomes "5" by the increase of "+5", and the sum total is now "85". At the time point "480", the velocity value is "80" and the volume data becomes "10" by the increase of "+5", and the sum total is "90" accordingly. At the time point "720", the velocity value stays "80" and the volume data becomes "15" by the increase of "+5", and the sum total is "95". At the time point "960", the velocity value is "80" and the volume data becomes "20" by the increase of "+5", and the sum total is "100". At the time point "1200", the velocity value stays "80" and the volume data becomes "25" by the increase of "+5", and the sum total is "105". Further, at the time point "1440", the velocity value is "80" and the volume data becomes "30" by the increase of "+5", and the sum total is "110" accordingly. The manner of the volume increase of the above description is illustrated in FIG. 5c.

While the above description is to explain how the edition takes place in connection with the volume of the tone sounding, edition may be of other kinds such as note durations, note pitches and introducing trill performance. For example, in the case where a trill sign is added to the music score, the associated program executes the processing of adding note event data for the trilling notes corresponding to the sign of the "trill". The added note event data in the intermediate data set then causes the creation of the performance event data to be introduced into the performance data set.

The program for executing the above-described processing of music score edition may preferably be included in an automatic music performance program to be installed in a music score editing apparatus such as of a hardware structure shown in FIG. 1. Referring to several drawings, herein below will be described the processing which takes place according to the automatic music performance program.

FIG. 6 shows the main routine processing which starts when the automatic music performance program is initiated. As the main processing is started, initialization of the system takes place at a step S1, including a setting procedure of the initial screen on the display device 4, preparing various buffers in the RAM 13, resetting flags in the respectively allotted memory sites, and so forth. Next, a step S2 judges whether the start of composing a new music score is commanded. Where there is a command of starting a new music score composition, the process moves forward to a step S3 to conduct the music score composition processing. Where there is no command of starting a new music score composition, the process skips the step S3 process and jumps forward to a step S4 to judge whether there is a command of starting a music score edition. The processing of music score composition includes creation of not only music score data, but also intermediate data including note data and sign data, and also performance data.

When the step S3 judges that there is a command of starting the music score edition processing, a step S5 conducts the music score edition processing, in which the edition of the music score data also involves edition of the note data and the sign data constituting the intermediate data and edition of performance data. After the completion of the music score edition processing at the step S5, the process moves forward to a step S6 to execute automatic performance processing which realizes an automatic music performance according to the performance data as edited upon receipt of an instruction from the user to start an automatic music performance. Then, some other processing will be conducted at a step S7 according to necessity, before a step S8 judges whether the termination of the main routine processing is commanded. When the judgment is affirmative (YES), the main routine processing comes to an end. But, when negative (NO), the process goes back to the step S2 for the music score composing processing, and the process loop will be repeated until a command to terminate the main routine processing is made.

Referring to the flow chart of FIG. 7, the processing for composing music score data will be described. The music score composition processing is a subroutine process for the step S3 of FIG. 6. In response to a command to start the composition of music score data anew, the music score composition processing is started. For the first thing to do, the user inputs and determines the number of performance parts (instruments or voices for a parallel progression) to be included in the composition at a step S10. Then, five-line staves are displayed on the display screen 4 in a number corresponding to the determined number of parts, and basic music score data is prepared at a step S11. In the preparation of the basic music score data at the step S11, there are prepared storage regions on the RAM 13 for the general setting data as set for the composition and for each of the performance parts but containing data representing the part number only. The user then places or pastes notes and other signs on to the staves displayed on the screen of the display device 4 using the keyboard 2 or the mouse 3 to build an intended music score. During this process, a step S12 judges whether there is an operation for inputting a music score event. When the step S12 judges that there is such an operation, a step S13 writes in the display event data according to the input operation at the position in the music score data corresponding to the note or the sign inputted on the stave. That is, at the step S11, the newly inputted display event data are stored in the storage region prepared for the event data of the respective performance parts in the music score data, one event after another, in the order of the events occurring in the performance.

Next, a step S14 conducts other processing such as the processing of adding or deleting a performance part and the processing of deleting or moving an inputted score event, and then a step S15 judges whether the termination of the music score composition processing is commanded or not. When the judgment at the step S15 is negative (NO), the process goes back to the step S12 to repeat the above described music score composition processing, in which when the judgment at the step S12 is negative (NO), the process skips the step S13 and jumps to the step S14 for the other processing. By repeating the processing loop of the step S12 through to the step S15, the music score data as shown in FIG. 2a will be constructed. When a command to terminate the music score composition processing is made, the process moves forward to a step S16 to further conduct intermediate data processing to create note data and sign data based on the composed music score data, as will be described in detail hereinafter. Next, a step S17 conducts performance data processing #1 to produce performance data from the intermediate data containing the created note data and sign data, as will be described in detail later. Then, the processing of this subroutine comes to an end.

Referring next to the flow chart of FIGS. 8a and 8b in combination, the processing for handling intermediate data will be described. The intermediate data processing is a subroutine process for the step S16 of FIG. 7. When the music score composition processing is over and the intermediate data processing is started, a step S20 prepares basic note data and basic sign data. In the preparation of the basic note data frame and the basic sign data frame at the step S20, there are prepared (secured) storage regions on the RAM 13 for the general setting data as set about the intermediate data and for each of the performance parts but containing only data representing the part number for the note data and the sign data to be stored in the succeeding inputting operations. Thereafter, a step S21 reads out the display event data, one event after another event in the ordered sequence, from the top of the music score data and a step S22 judges whether all of the display event data have been read out. Where there are still any display event data left un-read, the process moves forward to a step S23 to judge whether the read-out display event data is note display event data which causes the display of a note on the screen. When the display event data is the note display event data, a step S24 creates note event data defining the tone generation time point, the tone pitch, the tone velocity (the tone intensity is often termed as "tone velocity" in this technical field, as the key striking strength or the key depressing velocity determines the intensity of the tone produced on the piano) and the tone duration based on the read-out note display event data, and writes the created data together with an uniquely given label into the note data storage region storing the basic note data frame (only part numbers at the beginning), one event after another event, successively.

As the created note event data is written in the assigned storage region, the process goes back to the step S21 to read out the next display event data, thus repeating the same processing loop as described above. In case the read-out display event data is display event data to display a musical sign, the above explained note event data will not be created (bypassing or skipping the step S24) and the next display event data is read out at the step S21. In this way, note event data are created in correspondence to all of the display event data that are to display notes among the display event data, and the created note event data are written into the prepared storage region, thereby composing a note data set as shown in FIG. 3. Then the step S22 judges that the display event data for all the display events have been read out, and the process moves forward to a step S25 (FIG. 8b) to restart reading the music score data from the beginning.

Then the display event data are read out, one event after another successively, from the top of the music score data set through the process loop of steps S26 to S29. In this process loop, the step S26 reads out the display event data for one display event from the music score data, the step S27 judges whether the display event data for all the display events have been read out, and if there are any display event data remaining unread, the step S28 judges whether the read-out display event data is sign display event data to display a musical sign, and if the judgment is affirmative (YES), the step S29 creates sign event data which contains program indication data and parameter data, the program indication data being data which indicates a program to be used for conducting a process corresponding to the sign, and the parameter data being data which is used in the data processing for the sign.

As the created sign event data is written in the assigned storage region, the process goes back to the step S26 to read out the next display event data, thus repeating the same processing loop as described above. In case the read-out display event data is display event data to display a note, the above explained sign event data will not be created (bypassing or skipping the step S29) and the next display event data is read out at the step S26.

In this way, sign event data are created in correspondence to all of the display event data that are to display signs among the display event data, and the created sign event data are written into the prepared storage region, thereby composing a sign data set as shown in FIG. 4a. Then the step S27 judges that the display event data for all the display events have been read out, and the process moves forward to a step S30 to sort the created sign event data according to the predetermined priority order of the sign events. The priority order means the order of conducting data processing, for example, that the processing for modifying tone generation time points and modifying tone durations (gate time lengths) will be conducted prior to the processing for modifying volumes (velocities), and that the processing for deleting data will be conducted last after other kinds of data processing. To sort the data is to place the data in order of given priority. As the sorting process is over, the processing for the intermediate data comes to an end.

Referring next to the flow chart of FIG. 9, the processing #1 for handling performance data will be described. The performance data processing #1 is a subroutine process for the step S17 of FIG. 7. As the intermediate data processing (S16) is over, the performance data processing #1 (S17) starts. First, a step S35 prepares a basic performance data frame, in which there are prepared (secured) storage regions on the RAM 13 for the performance data containing the general setting data as set about the performance data and the performance part numbers. In the prepared (secured) performance data region, all the note event data in the note data set created at the intermediate data processing are written with respect to each performance part to constitute a primary performance event data set. A step S35 reads out the sign event data for one sign event after another from the top among the sign event data set (data train) as created for the respective sign events in the intermediate data processing, and rewrites the note event data stored in the performance event data set (modification or addition of the performance data) according to each of the read-out signs.

This processing includes modification of the performance event data in the performance data set and addition of new performance event data according to the predetermined programs (functions), each of which is previously prepared for each kind of the signs among the sign event data. The predetermined program is read out according to the program indication data included in the sign event data, and makes reference to the parameter data in the sign event data and edits the performance event data having the corresponding label. In this instance, the data which correspond to the note event data in the note data set are called performance event data, as they are stored in the storage region for the performance data set. Next, a step S37 deletes all the label data in the performance data set before ending the performance data processing #1. Thus created is the performance data set as shown, as an example, in FIG. 5a.

Referring next to the flow chart of FIG. 10, the processing for editing music score data will be described. The music score data processing is a subroutine process for the step S5 of FIG. 6. As the music score data processing is started, the user selects a music score data set to be edited at a step S40. Upon selection of an intended music score data set, the display screen 4 exhibits a music score based on the selected music score data set (file) at a step S41. Then, a step S42 judges whether there is any edition commanded by the user. As the edition is instructed by the user by means of the keyboard 2 or the mouse 3 to add icons of notes or musical signs on to the music score staves displayed on the screen 4 or to delete or move the existing notes or signs from the score, the step S42 judges whether there is any such operation (manipulation) by the user. If the judgment is affirmative, a step S43 rewrites the data contents of the display event data in the music score data set corresponding to the operation for edition. Further, the step S43 changes (modifies) the music score displayed on the screen 4 in accordance with the edited data, for example, of a crescendo sign as shown by "a" in FIG. 13a.

Next, a step S44 judges whether the termination of the music score edition is commanded. In case there is no such command made, the process goes back to the step S42 to repeat the above described edition processing. As the user finishes the edition of the notes and signs in the music score and commands the termination of the music score edition processing, a step S45 rewrites the note data and the sign data of the intermediate data, referring to the edited music score data set, for example, as shown in FIG. 2b. In this instance, when new sign event data is added in the sign data set, such a sign is added at the position determined in accordance with the afore-mentioned priority order. For example, where a crescendo sign is added as shown in FIG. 13a, the sign event data "A" is inserted in the sign data set as shown in FIG. 4b. Then, the performance data set is edited through a performance data processing #2 at a step S46 based on the intermediate data set including the edited note data set and the edited sign data set, as will be described hereinafter, thereby ending the music score edition processing.

Referring next to the flow chart of FIG. 11, the processing #2 for handling performance data will be described. The performance data processing #2 is a subroutine process for the step S46 of FIG. 10. As the performance data processing #2 is started, a step S50 searches through the note data set for any edited note event data, and a step S51 judges whether there is any edited event represented by the edited note event data. If there is an edited event, a step S52 conducts modification, addition or deletion of performance event data in the performance data set based on the detected note event data, before going back to the step S50 for the next edition event in the note data set. The process of modification, addition or deletion of the performance event data takes place every time an edition event is detected during the repeated search for the edited note event data in the note data set. When the step S51 judges that there is no edited event left undetected, the process goes to a step S53.

The step S53 searches through the sign data set for any edited sign event data, and a step S54 judges whether there is any edited event represented by the edited sign event data. When an edited event is detected, a step S55 conducts edition of performance event data in the performance data set based on the detected sign event data, before going back to the step S53 for the next edition event in the sign data set. This edition is conducted in the priority order of processing the sign data and creates new event data based on the detected sign event data using the note event data in the note data set as parameter data for the processing. The created new event data is substituted for the corresponding performance event data in the performance data set, or is inserted in the performance data set, or some performance event data is deleted. This process of editing the performance data set is conducted, ever time an edition event is detected in the sign data set through the repeated process loop from the step S53 through the step S55, to finally make an edited performance data set, for example, as shown in FIG. 5b. When the step S54 judges that there is no edition event data left undetected, the performance data processing #2 comes to an end. While the above description is about the addition of a crescendo sign as an example, the present invention is of course applicable to any other musical signs for performance ornaments such as a trill and a vibrato.

The formats of various data may be such that the data of the respective tracks are stored in an intermingled condition. In such a situation, channel data may preferably be attached to each of the event data for dividing the event data into assigned performance parts for the processing. While the various data are stored in the RAM 13 in the above description, the data may be stored in the external storage device 17 having storage areas for the respective kinds of data. While the sign event data are stored in the priority order of sign events through an entire piece of music in the above described embodiment, a music piece may be divided into plural sections and the sign event data may be stored in the priority order of sign events within each of the divided sections. For example, the sign data may be stored being grouped for each measure and may be placed in the priority order within each measure, so that the edition of the note data set may be conducted on a one-measure-after-another basis. Further, while the note event data are attached with labels identifying the respective ones of the events, the labels may not necessarily be attached to the note event data, if the pointers representing the storage positions of the respective note event data will be used as the reference information to determine the correspondence between the respective sign event data in the sign data set and the note event data handled in the processing program.

The present invention may be practiced in the form of a music score edition program or in the form of an automatic performance program containing a music score edition program therein, but may not necessarily be limited thereto and may be practiced in the form of a music score edition apparatus including a personal computer and a music score edition program, or an automatic performance apparatus equipped with an automatic performance program that includes a music score edition program. The music score edition program or the automatic performance program including a music score edition program may be stored in a magnetic disk, an optical disk, a semiconductor memory and so forth, and may be supplied to a personal computer connected thereto, or may be supplied from external sources via a communication network.

A hard disk drive (HDD) is a storage device storing the music score edition program and various associate data to be the external storage device 17. In case the music score edition program is not stored in the ROM 12, the HDD may store the music score edition program, which in turn may be read out therefrom and written into the RAM 13, so that the CPU 10 will operate with the RAM 13 in a similar manner as the case where the program is stored in the ROM 12. This fashion may be advantageous in that addition to or up-grading of the music score edition program can be easily realized. A CD-ROM drive is a device from which the music score edition program and the various data stored in a CD-ROM can be read out, and can be used as the external storage device 17. The read-out program and data will be stored in a hard disk in the HDD. Also in this case, the new installment or the up-grading of the music score edition program can be easily conducted. Further, a floppy disk drive, a magneto-optical (MO) disk drive, and other storage media drives may be provided as the external storage device 17.

The communication interface 14 is connected to a communication network 8 such as a LAN (local area network), Internet and a telephone line to be further connected to a commercial server computer (although not shown). Thus, the music score edition program and the various data can be downloaded from the server computer to the personal computer 1, in case such a program and data are not stored within the personal computer 1. The personal computer 1 will send a command requesting a music score edition program and associated data from the server computer via the communication interface 14 and the communication network 8. Upon receipt of the command, the server computer will then deliver the requested music score edition program and data to the personal computer 1 via the communication network 8, and the personal computer 1 will then receive the program and data via the communication interface 14 to store in the external storage device 17, there by completing the downloading procedure.

As explained hereinabove, the present invention creates intermediate data containing note event data and sign event data, and then creates performance data based on the intermediate data containing note event data and sign event data, and therefore when note events or sign events are edited in the music score data set, the intermediate data will be edited in association with the edited note event data and sign event data, and then the performance data will be edited in association with the edited intermediate data, to finally obtain edited performance data. This will greatly alleviate the burden of processing for editing the performance data following the edition on to the music score data, and the edition processing using a personal computer or the like apparatus can be conducted efficiently in a relatively short time.

While particular embodiments of the invention have been described, it will, of course, be understood by those skilled in the art without departing from the spirit of the present invention so that the invention is not limited thereto, since modifications may be made by those skilled in the art, particularly in light of the foregoing teachings. It is therefore contemplated by the appended claims to cover any such modifications that incorporate those features of these improvements in the true spirit and scope of the invention.

What is claimed is:

1. A music score editing apparatus comprising:
  a music score data composing module which composes a music score data set including display event data that define notes and signs in musical notation and respective positions of said notes and signs for displaying a music score in a form of musical notation;
  an intermediate data creating module which creates an intermediate data set corresponding to said music score data set, said intermediate data set including a note data set which contains note event data corresponding to said notes and their respective positions, and a sign data set which contains sign event data corresponding to said signs and their respective positions; and
  a performance data creating module which creates a performance data set corresponding to said intermediate data set, said performance data set including performance event data that define notes to be played in terms of at least pitches and generation times of the respective notes to perform a musical piece as defined by said music score data set.

2. A music score editing apparatus as claimed in claim 1, wherein said intermediate data creating module creates said sign event data in said sign data set as being data that include processing information representing processing for creating performance event data corresponding to said respective musical signs, and include identifying information representing which of the note event data in said note data set is used in said respective processing; and said performance data creating module creates said performance data set by modifying the note event data in said note data set in accordance with the respective sign event data in said sign data set.

3. A music score editing apparatus as claimed in claim 2, wherein said intermediate data creating module creates said note event data in said note data set as being data that include content information representing contents of respective note events in a musical score, and include said identifying information for identifying the respective note event data; and said intermediate data creating module creates said sign data set after creating said note data set, by referring to said created note data set.

4. A music score editing apparatus as claimed in claim 1, wherein said intermediate data creating module stores said sign event data in said sign data set with predetermined priority order; and said performance data creating module creates said performance data set in accordance with said predetermined priority order of the respective sign event data as stored in said sign data set.

5. A music score editing apparatus as claimed in claim 1, further comprising:
  a music score editing module which edits contents of said music score data set;
  an intermediate data editing module which edits portions of said intermediate data set that correspond to said edited contents of said music score data set; and
  a performance data editing module which edits portions of said performance data set that correspond to said edited portions of said intermediate data set.

6. A music score editing apparatus as claimed in claim 5, wherein said intermediate data creating module creates said sign event data in said sign data set as being data that include processing information representing processing for creating performance data corresponding to the musical signs in a music score, and include identifying information representing which of the note event data in said note data set is used in said processing; said intermediate data editing module edits sign event data in said sign data set corresponding to the edited portions of said music score data set; and said performance data editing module edits the portions of said performance data set that correspond to said sign event data based on the edited sign event data.

7. A music score editing apparatus as claimed in claim 6, wherein said intermediate data creating module creates said note event data in said note data set as being data that include contents information representing contents of the respective note events in a music score, and include identifying information for identifying the respective note data, the identifying information being said identifying information included in said sign event data in said sign data set; said intermediate data creating module edits the note event data in said note data set at portions corresponding to the edited portions of said music score data set, and edits the sign event data in said sign data set at portions corresponding to said note event data; and said performance data editing module edits said performance data set at portions corresponding to said note event data and said sign event data based on the edited note event data and the edited sign event data.

8. A music score editing apparatus as claimed in claim 1, wherein said intermediate data creating module stores said sign event data in said sign data set at portions corresponding to said edited portions in said music score data set in a predetermined priority order; and said performance data editing module edits portions of said performance data set corresponding to said edited sign event data based on said edited sign event data according to said predetermined priority order.

9. A storage medium storing:
- a musical score data set including display event data that define notes and signs in musical notation and respective positions of said notes and signs for displaying a music score in a form of musical notation;
- an intermediate data set corresponding to said music score data set, said intermediate data set including a note data set which contains note event data corresponding to said notes and their respective positions, and a sign data set which contains sign event data corresponding to said signs and their respective positions; and
- a performance data set corresponding to said intermediate data set, said performance data set including performance event data that define notes to be played in terms of at least pitches and generation times of the respective notes to perform a musical piece as defined by said music score data set.

10. A storage medium as claimed in claim 9, wherein said intermediate data set includes the sign event data in said sign data set as being process information representing processing for creating performance data corresponding to musical signs in a music score, and includes identifying data representing which note event data in said note data set is used in said processing.

11. A storage medium as claimed in claim 10, wherein said intermediate data set includes said note event data in said note data set as being data of contents information representing contents of the respective note events in said note data set, and includes identifying information for identifying the respective note event data, the identifying information being the identifying data of the sign event data in said sign data set.

12. A storage medium as claimed in claim 9, wherein said sign data set in said intermediate data set stores the sign event data in a predetermined priority order.

13. A method for editing music score comprising:
- a step of composing a music score data set including display event data that define notes and signs in musical notation and respective positions of said notes and signs for displaying a music score in a form of musical notation;
- a step of creating an intermediate data set corresponding to said music score data set, said intermediate data set including a note data set which contains note event data corresponding to said notes and their respective positions, and a sign data set which contains sign event data corresponding to said signs and their respective positions; and
- a step of creating a performance data set corresponding to said intermediate data set, said performance data set including performance event data that define notes to be played in terms of at least pitches and generation times of the respective notes to perform a musical piece as defined by said music score data set.

14. A storage medium for use in an apparatus for editing music score, said apparatus being of a data processing type comprising a computer, said medium containing a program that is executable by the computer, the program comprising:
- a module of composing a music score data set including display event data that define notes and signs in musical notation and respective positions of said notes and signs for displaying a music score in a form of musical notation;
- a module of creating an intermediate data set corresponding to said music score data set, said intermediate data set including a note data set which contains note event data corresponding to said notes and their respective positions, and a sign data set which contains sign event data corresponding to said signs and their respective positions; and
- a module of creating a performance data set corresponding to said intermediate data set, said performance data set including performance event data that define notes to be played in terms of at least pitches and generation times of the respective notes to perform a musical piece as defined by said music score data set.

* * * * *